United States Patent [19]

Huber et al.

[11] 4,210,785
[45] Jul. 1, 1980

[54] TAPE REPLAY SYSTEM

[75] Inventors: William B. Huber, Oak Park; Ian L. Bower, Rosemont; James A. Flynn, LaGrange; Gary C. Elfring, Lombard, all of Ill.

[73] Assignee: Bell & Howell Company, Chicago, Ill.

[21] Appl. No.: 946,988

[22] Filed: Sep. 28, 1978

[51] Int. Cl.$^2$ .......................... G11B 27/00; G11B 5/02
[52] U.S. Cl. .................... 179/100.1 PS; 179/100.1 C; 360/12; 360/14; 360/72.2
[58] Field of Search ............... 179/100.1 C, 100.1 PS, 179/100.4 D; 360/12, 13, 14, 33, 60, 137, 72.1, 72.3, 72.2, 74.2, 74.4, 15

[56] References Cited

U.S. PATENT DOCUMENTS

| | | | |
|---|---|---|---|
| 3,541,271 | 11/1970 | Joslow | 360/14 |
| 3,601,553 | 8/1971 | Cooper | 360/72.3 |
| 3,601,554 | 8/1971 | Rak | 360/72.3 |
| 3,601,556 | 8/1971 | Cooper | 360/72.3 |
| 3,714,382 | 1/1973 | Sykes | 360/72.3 |
| 3,721,757 | 3/1973 | Ertlinger | 360/10 |
| 3,804,993 | 4/1974 | Honnold | 179/6 E |
| 3,812,532 | 5/1974 | Crosser | 360/72.2 |
| 3,913,133 | 10/1975 | Aregger | 360/72.3 |
| 3,921,220 | 11/1975 | Primosch | 360/72.3 |
| 3,949,420 | 4/1976 | Older | 360/72.3 |
| 3,987,484 | 10/1976 | Bosche | 360/33 |
| 3,990,710 | 11/1976 | Hughes | 360/15 |
| 4,000,518 | 12/1976 | Stearns | 360/63 |
| 4,054,926 | 10/1977 | Haymes | 360/72.1 |
| 4,141,045 | 2/1979 | Sheehan | 360/15 |

OTHER PUBLICATIONS

*Television Broadcasting,* ©1973 by Howard W. Sons, Inc., pp. 328-331.

*Primary Examiner*—James W. Moffitt
*Assistant Examiner*—Alan Faber
*Attorney, Agent, or Firm*—John H. Moore; Roger M. Fitz-Gerald

[57] ABSTRACT

A system is described for replaying, in any selected sequence, programs recorded on a tape. The system is adapted to read a tape having tape location information and program location information thereon. In a preferred embodiment, a keyboard is included for selecting desired programs for replay in any sequence. In response to that selection, a controller determines from the program location information where the selected programs begin and end on the tape and causes those programs to be replayed in the sequence selected.

Preferably, the system also permits replay of any tape segment or part of a recorded program by operator input of tape location information corresponding to the starting and stopping tape locations of the selected tape segments.

17 Claims, 18 Drawing Figures

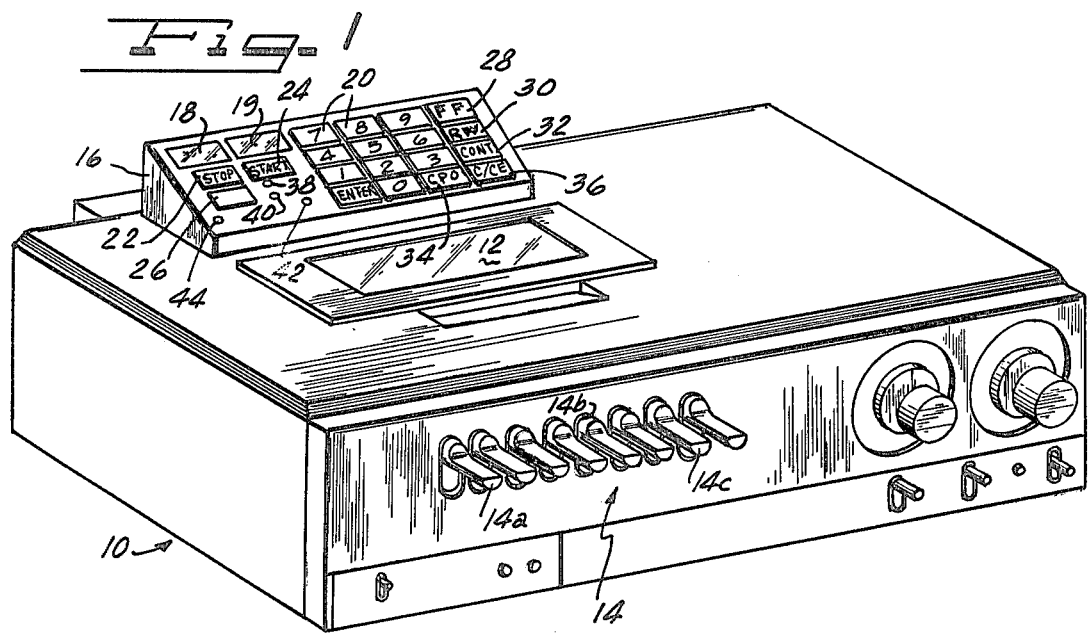
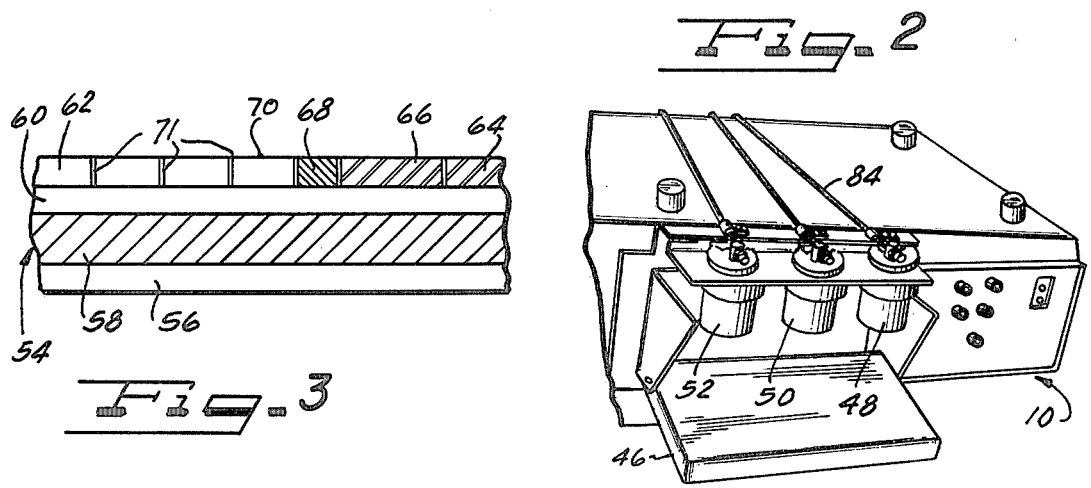
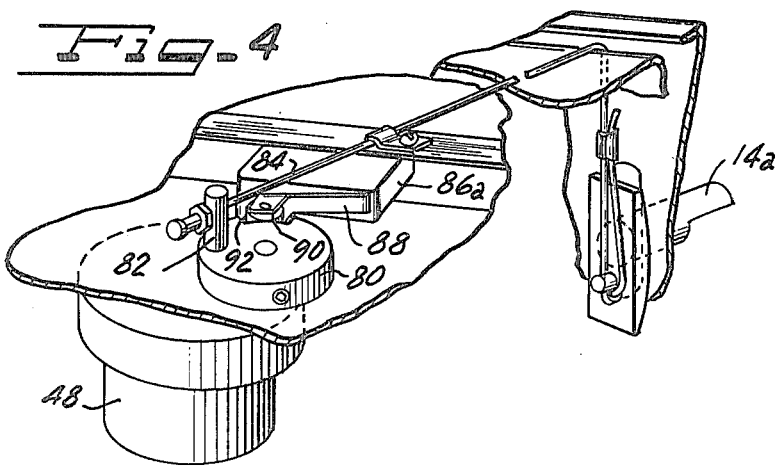

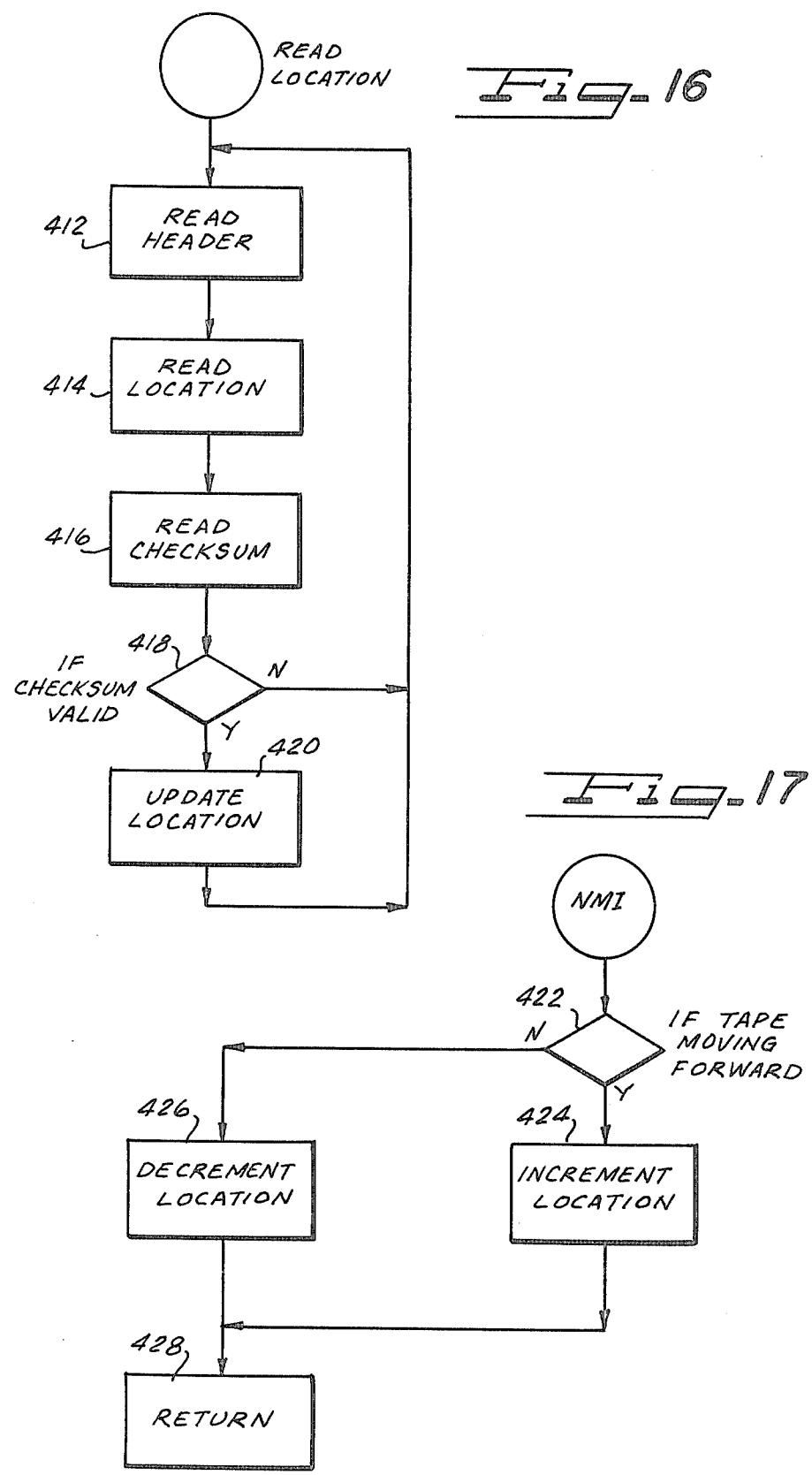

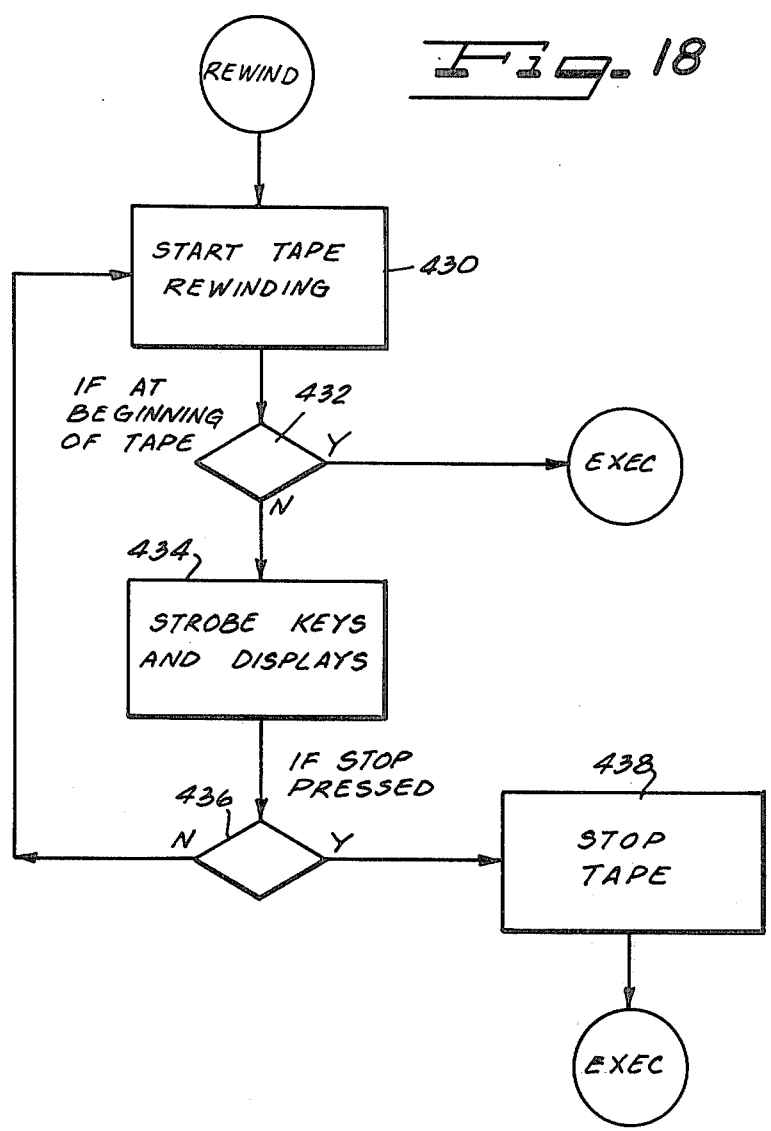

TAPE REPLAY SYSTEM

BACKGROUND OF THE INVENTION

This invention is directed generally to machines for playing back information previously recorded on tape. The invention is particularly addressed to a system for replaying, in any selected sequence, programs recorded on the tape.

The art has previously proposed a number of ways of altering playback of a recorded tape. According to some proposals, various portions of the tape are skipped during replay so that only designated portions thereof are played back. However, such schemes normally do not permit replay of various tape segments in any desired sequence, and particularly not in a manner in which it is easy for an operator to change the sequence of replay. For the most part, the prior proposals have not permitted an operator to format the replay of the tape so that any portion thereof can be replayed in any sequence.

OBJECTS OF THE INVENTION

It is a general object of the invention to provide an improved system for re-formatting the playback of a recorded tape.

It is a more specific object of the invention to provide an improved system for re-formatting the replay of a tape so that selected programs recorded on the tape can be replayed in any operator-selected sequence.

It is another object of the invention to provide a tape replay system in which the sequence of replay of programs recorded on the tape is easily changed, and in which any portion of the tape can be replayed in any sequence.

BRIEF DESCRIPTION OF THE FIGURES

The above and other objects of the invention are more particularly set forth in the following detailed description and in the accompanying drawing of which:

FIG. 1 illustrates a video playback machine incorporating the invention;

FIG. 2 is an inverted view of the machine of FIG. 1, revealing its bottom and rear portions;

FIG. 3 illustrates a video tape encoded with tape and program location information for use with the machine of FIG. 1;

FIG. 4 illustrates a control switch actuator included in the machine of FIG. 1;

FIG. 16 is a flow chart of a "read location" routine by which tape addresses on the tape of FIG. 3 are read;

FIG. 17 is a flow chart of a routine which is executed for counting tape location signals when the tape of FIG. 3 is transported at high speed; and FIG. 18 is a flow chart of a "rewind" routine shown generally in FIG. 8.

SUMMARY OF THE INVENTION

Figure 5:
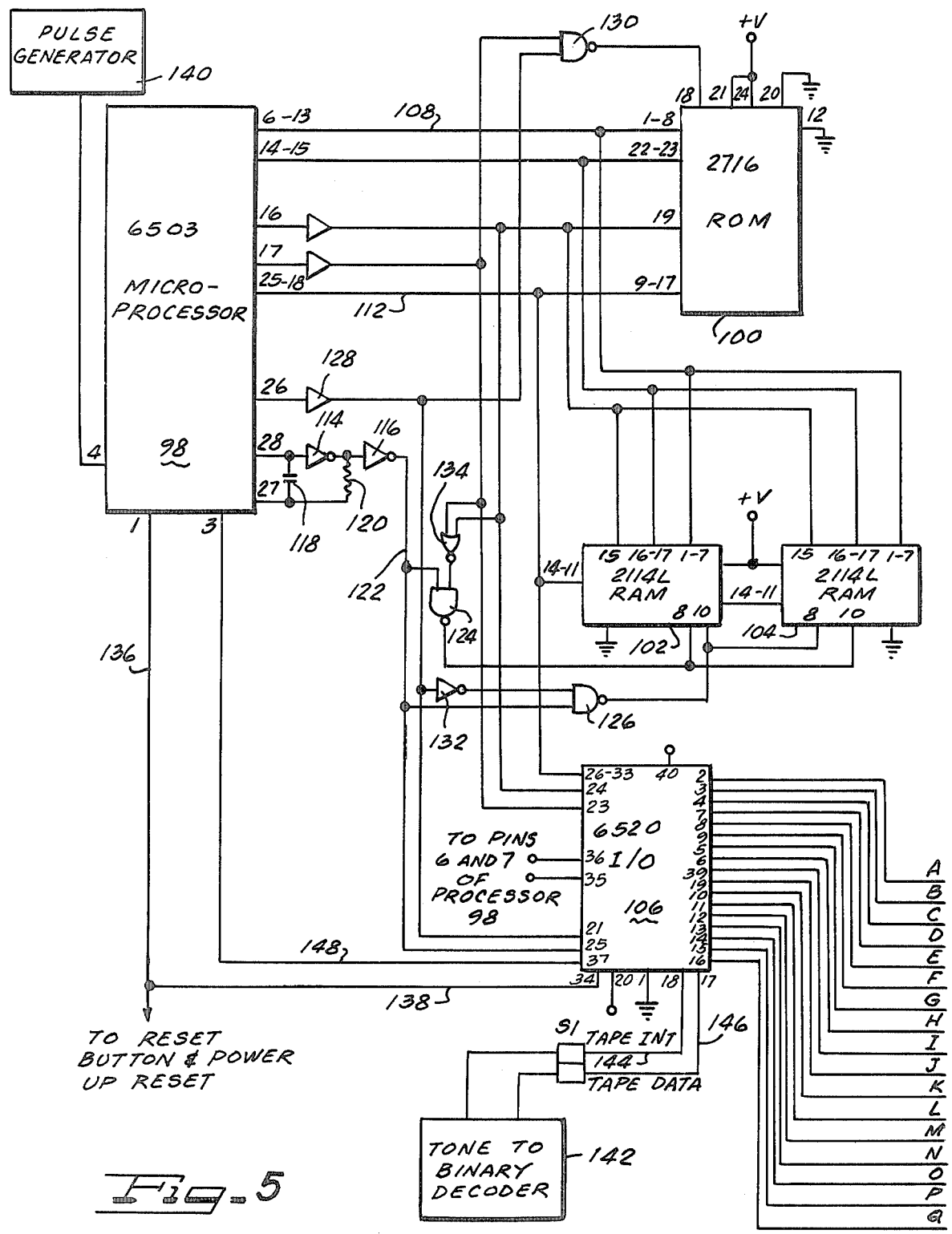
FIGS. 5 and 6 constitute a schematic drawing of a microprocessor based controller for controlling the functions of the playback machine.

Broadly stated, a conventional playback machine is modified to include a playback system which comprises means for reading a tape on which a plurality of programs are recorded and on which tape location indicia and program location information is encoded. The program location information correlates the position on the tape of the recorded programs with the tape location indicia. Also included is operator-actuatable means, preferably comprising a keyboard, for selecting programs for replay and the sequence in which the selected programs are replayed.

A controller which is responsive to the operator selection of programs determines, from the program location information on the tape, the tape location of the selected programs and actuates the playback machine to replay the selected programs in the sequence selected.

DESCRIPTION OF THE PREFERRED EMBODIMENT

Referring now to the Figures, and particularly to FIGS. 1 and 2, there is shown a conventional tape playback machine 10 modified in accordance with the invention. Preferably, the machine 10 is a video player/recorder for replaying video on a television monitor.

The machine 10 has an access panel 12 which raises to permit insertion and removal of a standard video tape cassette. Located internally of the machine 10 are a record/playback head, spindles for transporting the tape between take-up and supply reels, and the other hardware typically associated with such machines.

Located at the front of the machine 10 are a number of control switches in the form of push-buttons 14 to be actuated by an operator for controlling the machine in a "manual" mode. Included are a "play" button 14a, a "rewind" button 14b, and a "fast-forward" button 14c. The machine also includes a number of other front panel controls which are conventional and do not relate to the invention.

The modifications described hereinafter enable the machine 10 to operate in an "automatic" mode wherein the operator selects various numbered segments or programs on the tape for replay in any desired sequence. When in this automatic mode, interface between the operator and the machine is effected by a panel 16 mounted atop the machine.

The panel 16 includes an LED (light-emissive device) display 18 for indicating to the operator which particular program on the tape is selected for replay. Another LED display 19 indicates to the operator what portion of the tape is then being played back. In one mode of "automatic" operation, numbers are illuminated at the display 19 to indicate the "address" of that portion of the tape then moving past the play head. In another mode of "automatic" operation, program numbers are displayed which correspond to prenumbered programs on the tape to inform the operator of which one of the tape programs is being played.

The panel 16 also includes a operator-actuatable means for selecting programs for replay and the sequence in which the programs are to be replayed, such means including a keyboard having a number of program selection keys 20. The keys 20 are numbered to permit the operator to select a particular program for replay or particular addresses of the tape for replay in any desired sequence.

Also carried by the panel 16 are nine operator-actuable function buttons. They are: a stop button 22, a start button 24, an auto/manual button 26, a fast-forward button 28, a rewind button 30, a continue button 32, a CPO (Custom Programming Option) button 34, and a clear/clear-entry button 36. An "automatic" light 38 and a "manual" light 40 are included to inform the operator of the mode in which the machine is operating. An "enter" light 42 and an "incorrect entry" light 44 instruct the operator to enter a program selection and that an incorrect program selection was entered, respectively.

A microprocessor-based controller for receiving and operating on the commands received from the panel 16 is mounted at the rear of the machine 10. As shown, (FIG. 2) a hinged panel 46 (shown tilted upwardly) is included for mounting the controller thereon. Also mounted at the rear of the machine 10 and beneath the panel 46 are motors 48, 50, and 52 which, when actuated by the controller, cause the "play" button 14a, the "rewind" button 14b, or the "fast-forward" button 14c to be depressed for transporting the tape when the machine is in the automatic mode. The details of the connection between the motors 48, 50, and 52 are described in more detail hereinafter.

As indicated above, the machine 10 is modified according to one aspect of the invention to replay individual programs on the tape in any sequence selected by the operator. To carry out that function, the controller must "know" which portion of the tape is at the play head and where the selected programs are on the tape. Toward this end, two means for ascertaining tape position are provided. The first involves counting signals representative of tape location, as, for example, pulses representative of the number of revolutions of the tape's take-up reel. As is conventional in video tape player/recorders, the motion of the take-up reel is transferred to a motion sensor, as in the form of a light chopper, to generate pulses when the tape is moving. Another form of motion sensor is a Hall-effect device as found in the J.V.C. model HR 3600 AU player/recorder. In the latter recorder, a wheel which is rotated by the tape's take-up reel carries a plurality of magnetic north and south poles. Adjacent that wheel is a Hall-effect device which senses the rotating poles and develops electrical pulses in synchronism with tape transport. The number of pulses generated is representative of the number of rotations of the take-up reel. The unmodified machine 10 normally senses the occurrence of those pulses to determine whether the tape is being transported. In the present modified machine, the Hall-effect device is included for generating such pulses and the controller counts those pulses (during rewind and fast-forward modes) to determine the position of the tape.

The second means utilized by the modified machine 10 to determine tape position (during the "play" mode) includes a sensor for sensing tape location indicia, preferably in the form of audio tones on the tape, which tones are encoded with tape address information. A video tape 54 which includes that information and which is encoded according to a preferred embodiment of the invention, is shown in FIG. 3.

As shown, the tape 54 includes a conventional control track 56 encoded with information for controlling the speed of the tape and the speed of the video play heads to ensure that the heads track the tape properly.

Located above the control track 56 is a video track 58 having video recorded thereon in the conventional helical format. The video which is recorded on the track 58 may include a plurality of programs, instructional material, sales presentations, or any other form of information. Whatever the content of the video, it is assumed that various segments thereof may be desired to be replayed without replaying other segments thereof. Hence, in the description to follow, all such tape segments are referred to as "programs".

The audio which accompanies the video is encoded on another track 60 in the customary manner.

Along the topmost edge of the tape 54 is a second audio track 62 on which information is encoded to enable the controller to access selected tape segments or programs. Near the beginning of the track 62, there is a header 64, program location information in the form of a table of contents 66, reference starting position information 68, and an address portion 70 which may extend to nearly the end of the tape.

All the information on the track 62 is preferably encoded as audio tone bursts which are decoded as electrical signals in the form of logical data, i.e., binary ones and zeros. Each binary digit may be made up of a pair of tone bursts, each such pair having a fixed duration, as 0.833 milliseconds, for example. In a preferred embodiment, each pair of tone bursts includes one tone burst of 9.6 KHZ and another tone burst of 4.8 KHZ, the ratio of the duration of the 9.6 KHZ burst to the duration of the 4.8 KHZ burst indicating a one or a zero. More specifically, a binary zero preferably comprises two cycles of 9.6 KHZ followed by three cycles of 4.8 KHZ; a binary one comprises six cycles of 9.6 KHZ followed by one cycle of 4.8 KHZ. All such tone bursts are read by an audio read head and decoded by a tone-to-binary-decoder to be described hereinafter. Preferably, the audio read head located in the unmodified machine 10 is replaced with an audio read head capable of reading audio tracks 60 and 62 simultaneously.

Referring more specifically to the header 64, the latter is encoded with a series of bursts representative of forty binary ones to indicate the beginning of a record. To further indicate that the table of contents 66 follows, a one byte code may be included immediately after the header 64.

The table of contents 66 lists in sequence the addresses on the tape 54 where each program recorded thereon is located. That is, it includes, in sequence, the starting tape address (in binary form) of the first program on the tape, the stopping address of that first program, and the starting and stopping address of every other program on the tape 54. By reading the table of contents 66, the controller "knows" where each program is located on the tape.

The reference starting position information 68 is included to give the controller a reference position from which it may count, to ascertain the position of any other segment of the tape. That reference position information may be in the form of a stream of tone bursts.

To enable the controller to find a particular tape segment, the address portion 70 is encoded with tape location indicia in the form of tape addresses 71. The addresses 71 preferably comprise tone bursts which indicate what portion of the tape is being played. Those bursts are spaced from each other along the length of the tape at one second intervals (i.e., one group of tone bursts for each 60 frames of video) and are encoded so as to indicate to the controller how far the tape has been advanced. Preferably, each tape address 71 includes a header encoded in tone bursts to indicate the beginning of a record, then a group of tone bursts selected to indicate to the controller that a tape address follows (to distinguish the tape addresses from the table of contents), and then a tape address comprising two eight bit bytes representative of the position of the tape at which the address is located. For example, the two bytes of adjacent tape addresses may be encoded as tape addresses 23 and 24. Successive tape addresses are encoded with sequentially increasing numbers. Following each tape address, there may be included a modulus 256 checksum to enable the controller to validate its decoding of the tape address.

By virtue of the fact that the table of contents 66 includes the starting and stopping addresses of each program recorded on the tape, the table of contents correlates the position of each program on the tape with the tape addresses 71.

Assuming that the controller has read and stored the table of contents 66, an operator may select for replay any programs on the tape 54 in any sequence. Such selection is effected in part by providing the operator with a printed table of contents listing, for example, 150 programs which have been already recorded on the tape 54, each program numbered sequentially, i.e., 1 through 150. The operator may then instruct the machine 10 to play programs 4, 1, and 25 in that order. In response, the controller searches its memory for the starting and stopping tape addresses of those programs and advances the tape in fast forward (or rewind) to the tape address indicated by the table of contents to be the starting address of program 4 (The way in which the tape is accurately advanced to program 4 is described hereinafter). The controller then causes program 4 to be played, all the time reading the tape addresses 70 on the tape. Hence, during such replay, the controller knows exactly where the tape is.

When the controller reads a tape address corresponding to the stopping address of program 4, the controller stops replay. It then advances the tape to the starting address of program 1, and plays that program until it reads a tape address which corresponds to the stopping address of that program. Program 25 is replayed in the same manner. The way in which the controller "finds" various programs on the tape is described briefly below.

In conventional tape players, the tape is placed against a read head when the player is in the play mode. When the player is in the rewind or fast-forward mode, the tape is withdrawn from the play head and positioned within the tape's cassette for high speed tape transport. This avoids running the tape past the play head at fast speeds. The machine 10 preferably includes that feature. Hence, when the machine 10 is searching for a program in the fast-forward or rewind mode, it cannot read the tape addresses 71 on the track 62. Accordingly, an additional manner of advising the controller as to the position of the tape during program searching is included.

As indicated earlier, the machine 10 includes a pulse generator which may be of the Hall-effect type for generating electrical pulses as the tape is transported between its supply and take-up reels. According to the invention, the controller counts those pulses when it is searching for a program in the fast-forward or rewind mode to determine tape location. When the pulses counted by the controller indicate that the tape is at or near the starting address of the program selected for replay the controller places the machine 10 in the play mode. At that time, the selected program is replayed while the controller reads the tape addresses 71. The values of those addresses are selected to correspond to a known function of the number of pulses which would otherwise be counted to arrive at that tape loation. Hence, there is a known correspondence between the value of the tape addresses and the number of pulses.

Upon reading a tape address, the controller uses that address to "up date" its tape position information. That is, if the controller had previously counted a number of pulses indicative of the tape being at address 23, and if the controller than reads tape address 25 from the tape, it ignores the tape location information derived from counting pulses and replaces it with the tape location information provided by the tape address. Hence, any minor error in tape location information is automatically expunged each time the controller reads a tape address.

As noted above, the machine 10 is constructed to operate in a manual mode and in an automatic mode. In the manual mode, an operator controls the operation of the machine 10 by manipulating the front panel push-buttons 14. In the automatic mode, the controller actuates the push-buttons 14a (play), 14b (rewind), and 14c (fast-forward), thus duplicating operator manipulation.

Control switch actuators by which the controller actuates the push-buttons 14a, 14b and 14c is depicted in FIGS. 2 and 4. As shown, motors 48, 50, and 52 are included, each of which is associated with one of the push buttons or switches 14a, 14b and 14c. Referring particularly to the motor 48 (FIG. 4) the latter responds to actuation by the controller for rotating a cam 80, the latter of which carries a pin 82 for rotation with the cam 80. Coupled to the pin 82 is a cable 84 which runs along the underside of the machine 10 and connects to the underside of the "play" push-button 14a. Thus, when the controller senses that actuation of the play push-button 14a is desired, the motor 48 is energized to rotate one revolution. As a result, the cam 80 also rotates the pin 82, thereby pulling on the cable 84 to depress the push-button 14a. To hold the push-button 14a down, there may be included a solenoid-actuated latch (not shown) for engaging the push-button. To release the latch, the solenoid is actuated to disengage the push-button and allow it to return to its "off" position.

To permit the controller to sense the status of the motor 48 and the cam 80, a switch 86a is disposed adjacent the cam 80. A spring-biased switch arm 88 terminates in a follower 90 for engaging the outer perimeter of the cam 80. Thus, when the cam 80 rotates for depressing the push-button 14a, the cam 80 presses the follower 90 downwardly for turning the switch 86a on. When the cam has rotated to its "rest" position, the follower 90 is received by a recess 92 in the cam 80. As a result, the follower 90 moves upwardly and turns the switch 86a off. Connections (not shown in FIGS. 2 and 4) between the switch 86a and the controller enable the controller to sense the status of the switch 86a and, hence, the status of motor 48 and cam 80 as explained more fully hereinafter.

Motors 50 and 52 include a cam, cable and switch arrangement identical to that described above for actuating push-buttons 14b and 14c. Hence, the status of those motors and their associated cams is also sensed by the controller.

Figure 6:
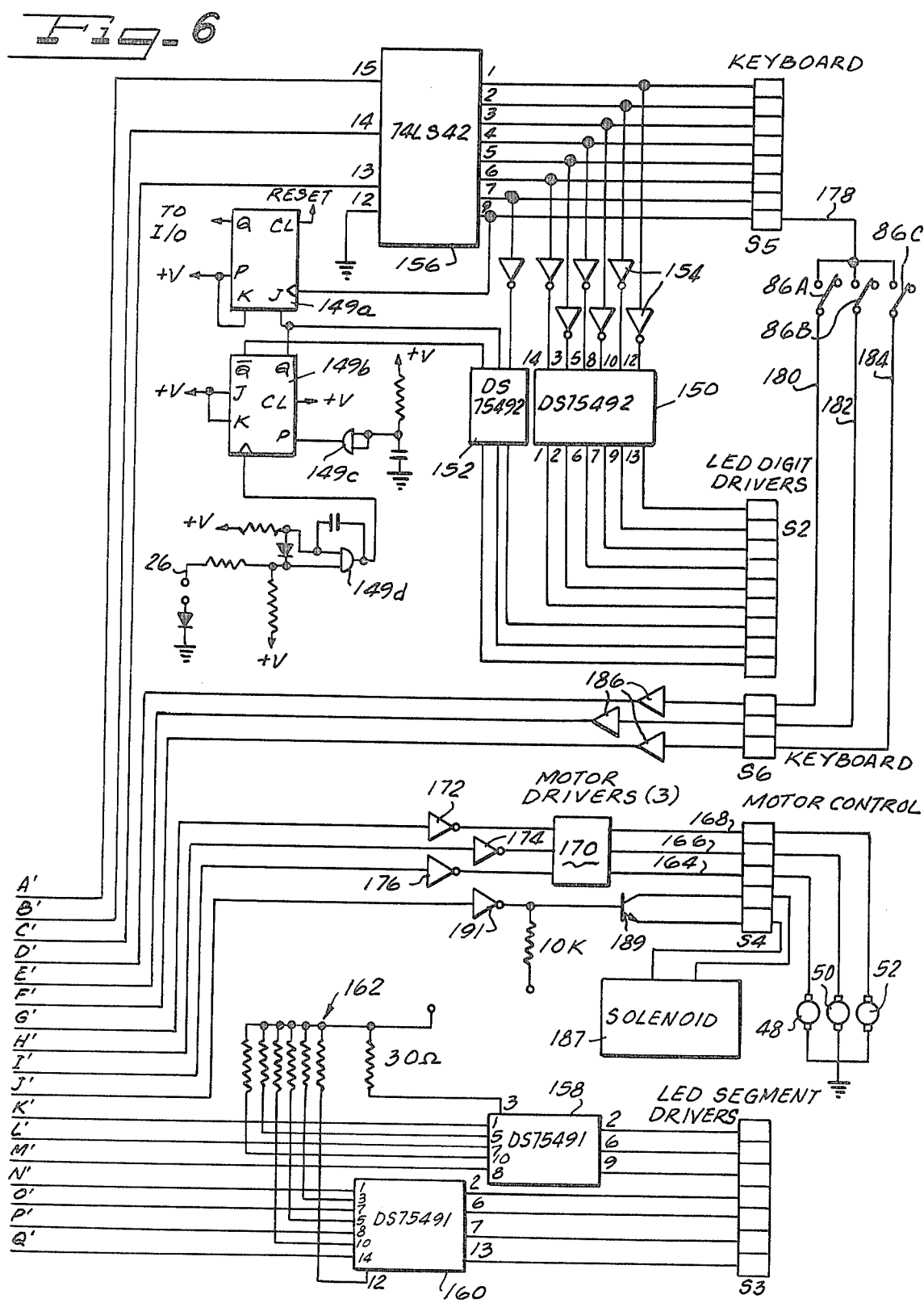

Having described the mechanical aspects of the machine 10 and its general operation, there follows a description of an electronic controller for effecting those functions. The controller and certain connections to circuitry and hardware external to the controller is shown in FIGS. 5 and 6, the latter of which is a continuation of FIG. 5. Lines interconnecting FIGS. 5 and 6 have the similar alphabetic designations. For example, line A of FIG. 5 connects to line A' of FIG. 6. As shown in these Figures, the controller includes a number of integrated circuit chips, each of which is shown with its commercial identifying number. In addition, the pins of each chip are numbered to show the preferred manner of interconnection.

As shown, the controller includes a microprocessing chip 98, a read only memory (ROM) 100, a pair of random access memories (RAMS) 102 and 104, and an input/output (I/O) device 106, all interconnected as shown. For clarity's sake, a plurality of similar chip interconnections are shown by a single line. For example, the line 108 represents 8 separate interconnections between pins 6-13 of the processor 98 and pins 1-8 of the ROM 100. Other multiple interconnections are shown similarly.

The lines interconnecting pins 6-17 of the processor 98 with the ROM 100 and the RAMS 102 and 104 are memory address lines. The line 112 interconnecting pins 18-25 of the processor 98 with the ROM 100, the RAM 102 and the I/O device 106 constitutes a bidirectional data bus for fetching instructions to be executed by the processor 98.

To generate one megahertz clock pulse for the controller, there are included a pair of inverters 114 and 116 interconnected as shown with a capacitor 118 and a resistor 120, the combination coupled with pins 27 and 28 of processor 98. The latter pins of the processor 98 receive clock pulses of different phases, and the output of the inverter 116 is coupled via a line 122 to pin 25 of the I/O device 106, to a NAND gate 124 and another NAND gate 126.

To indicate whether reading or writing is to be effected by the ROM 100, the RAMS 102 and 104 and the I/O device 106, pin 26 of the processor 98 is given a logic 1 level when reading is to occur and a logic 0 when writing is to occur. That latter pin is coupled via a buffer 128 to one input of a NAND gate 130, to an inverter 132, and to pin 21 of the I/O device 106. The NAND gates 124, 126 and 130, along with a NOR gate 134, function to select the ROM 100, the RAMS 102 or 104 and the I/O device 106 for either reading to or writing from those elements.

As is conventional, the processor 98 includes a reset input at its pin 1. That pin may be connected via a line 136 to reset buttons or switches which are external to the controller. The reset switches may include a manual reset switch and a switch or circuit actuated when the cassette door is closed and when a cassette tape is in the machine. In addition, a conventional "power-up" reset circuit (not shown) may be coupled to the line 136 to sense when the supply voltage for the controller reaches a design level and to then drive the line 136 low momentarily. That momentary low resets the processor 98 and also the I/O device 106 via a line 138.

To enable the processor 98 to count the aforementioned pulses which are generated by a Hall-effect device, for example, when the machine 10 is in a rewind mode or a fast-forward mode, a non-maskable interrupt input is provided at pin 4 of the processor 98. That pin is coupled to a pulse generator 140 which may be a conventional Hall-effect generator. Because the pulses received from the generator 140 are coupled to the processor's non-maskable interrupt input, those pulses will always be counted irrespective of where the controller is in its program (to be described hereinafter). In other words, the fact that the pulses are received at the interrupt input allows the processor 98 to interrupt the execution of its program to count an incoming pulse.

Disposed between the pulse generator 140 and the processor 98, there may be included any suitable pulse shaping circuit for conditioning the pulses for counting by the processor 98.

As indicated previously, the machine reads the tape to sense the tone bursts thereon, and a tone-to-binary decoder translates the tone bursts to a digital form for reading by the controller. As shown in FIG. 5, the tone-to-binary decoder 142 is coupled via a connector $S_1$ and lines 144 and 146 to pins 17 and 18 of the I/O device 106. The line 146 couples the digital signals (tape data) decoded by the decoder 42 to the I/O device 106, while the line 144 couples to the I/O device 106 a signal indicative of whether or not the data on the line 146 is valid. The latter signal is also developed by the tone-to-binary decoder 142.

To enable the processor 98 to determine the presence of valid data on lines 146, there is included a line 148 connecting pin 37 of the I/O device 106 to pin 3 of the processor 98. Line 148 carries a signal transition to processor 98 to indicate that data from the track 62 on the tape is being received by the I/O device 106.

The LED program display 18 and the tape position display 19 on the display panel 16 together may comprise six digits of a conventional LED display. As is customary, those LEDS are preferably arranged in a matrix for sequential strobing thereof, and are also connected to segment drivers which, when actuated, determine what segment of a digit to turn on. The strobe and segment driver connections for the LEDS in the program display 18 and the tape position display 19 are shown in FIG. 6.

As illustrated, the connector S2 has nine connections, the top six of which are coupled in customary fashion by connections (not shown) to one of six conventional LED digit drivers (not shown). The seventh connection on connector S2 is coupled to the "incorrect entry" light 44 on display panel 16. Those seven connections on connector S2 are coupled through drivers 150 and 152 to the outputs of inverters 154. The inverters 154 in turn are each coupled to an illustrated output of a binary to decimal decoder 156. The latter decoder develops, in a manner well known in the art, signals for strobing the LED digit drivers and the "incorrect entry" light 44 in response to the states of the signals received at its pins 13, 14, and 15 from the I/O device 106.

The two bottom-most connections of the connector S2 are coupled to the "auto" and "manual" lights 38 and 40 on the keyboard. Either one of those lights will be on, depending on the status of the auto/manual button 26. The circuit comprising flip-flops 149a and 149b, AND gates 149c and 149d, and their associated circuit elements, serve to sense the status of the auto/manual button 26, to "debounce" its switch contacts, to provide a driving signal via driver 152 for illuminating the "auto" light 38 or the "manual" light 40, and to provide the processor with a signal indicative of the status of the auto/manual button 26.

Specifically, the auto/manual button (shown as a switch 26 in FIG. 6) is coupled to one input of the AND gate 149d, the latter of which responds to the closing and opening of the switch 26 by changing the state of its output. That output remains constant for approximately ten milliseconds to ignore switch bounce which occurs during that interval.

The output of the AND gate 149d is coupled to the input of the flip-flop 149b which changes the state of its Q and $\overline{Q}$ outputs only when the output of the gate 149d changes on a negative-going transition. Thus, the flip-flop 149b stores the status of the switch 26 so that that status can be subsequently read by the processor, even if the status of the switch 26 is changed when the processor is in reset.

The AND gate 149c is connected as shown to sense power turn-on and to pre-set the flip-flop 149b for developing a high signal at its Q output when power is turned on.

The "auto" and "manual" lights receive driving signals from the Q and $\overline{Q}$ outputs of the flip-flop 149b, which outputs are coupled to the driver 152 and, from there, to the two bottom-most connections on the connector S2.

To provide the processor with information concerning the status of the switch 26, the flip-flop 149a receives the Q output of the flip-flop 149b and couples to pin 40 of the I/O device 106 a signal indicative of switch status. That signal occurs in response to a strobe signal received by the flip-flop 149a from pin 9 the decoder 156.

Conventional LED segment drivers (not shown) couple to the seven connections on connector S3 (FIG. 6) for receiving signals determinative of which segments of a digit are to be turned on. The connector S3 receives those signals from a pair of drivers 158 and 160 which are, in turn, coupled to pins 10-16 of the I/O device 106. Current limiting resistors 162 are coupled to drivers 158 and 160 as shown for limiting the current provided to the LED segment drivers. By these connections, the above described connections to the LED digit drivers, the I/O device 106 sequentially strobes the LED digit drivers via the decoder 156, inverters 154, drivers 150 and 152. In addition, the I/O device 106 drives the LED segment drivers in a conventional manner to determine which segments of a digit are to be turned on.

In circumstances where it is desired to increase the illumination of the LED's, an additional driver (not shown) is preferably included in each of the lines K' through Q' feeding to the drivers 158 and 160.

The motors 48, 50 and 52 which cause the play, fast-forward, and rewind buttons to be actuated are shown schematically in FIG. 6. As illustrated, one lead of each motor is coupled to a common ground connection, the other leads thereof being coupled to connections on a connector S4. Those motors receive signals for energization thereof via lines 164, 166 and 168, all of which are coupled to three conventional motor drivers 170. The motor drivers 170 are in turn coupled to inverters 172, 174 and 176, the latter of which receive motor actuation signals from the I/O device 106.

It has been explained that the controller senses the status of the motors 48, 50 and 52 to determine which of those motors are in a rest or non-rest position. Such sensing is achieved by determining the status of the aforementioned switches which are opened and closed in response to rotation of the motors 48, 50 and 52 and their respective cams. As shown in FIG. 6, the switches 86A, 86B and 86C which are responsive to the opening and closing of the motors 48, 50 and 52 all have a common connection to a strobe line 178 which is coupled to the bottom-most connection on connector S5. That connection is, in turn, coupled to pin 9 of the decoder 156 for strobing the switches 86A, 86B and 86C. Return lines 180, 182, and 184 couple each of the switches 86A, 86B and 86C to the three connections of connector S6, and from there are coupled to three buffers 186. The outputs of the buffers 186 are then coupled as indicated to the I/O device 106. With this arrangement, the status of each of the switches 86A, 86B and 86C is sensed by strobing line 178 and sensing the results of that strobe via the connections on the connector S6. The controller will thus "know" whether one or more of the motors 48, 50 and 52 is in its rest position.

As stated earlier, it is preferable to include a solenoid-actuated latch to release the switches 14. As shown schematically in FIG. 6, a solenoid 187 is included for actuating such a latch. The solenoid 187 is coupled as shown through connector S4 to a transistor 189, the latter being driven from an inverter 191 which receives drive signals from the I/O device 106.

In order to determine whether any of the keyboard buttons on the display panel 16 have been pressed, all of those buttons are arranged in the conventional array or matrix (not shown) so that their status may be determined by the sequential strobing of the number of strobe lines. The results of that strobing are detected on a plurality of return lines to the controller. The connections for that conventional arrangement are also shown in FIG. 6.

To strobe the display panel buttons, the outputs of the decoder 156 are coupled to connections on the keyboard connector S5. The latter connections are coupled by means not shown to conventional strobe lines connected to the push buttons on the display panel 16. Return lines (not shown) from that array of push buttons are coupled to the three connections on the connector S6 and are ultimately coupled to the I/O device 106. With this arrangement, the controller is capable of sensing the status of each of the push buttons on the display panel 16.

The tone-to-binary decoder 142 which is illustrated schematically in FIG. 5 may be in any form suitable for converting tone pulses to binary data. An examplary circuit which achieves that function is shown in FIG. 7, to which reference is now made.

Figure 7:
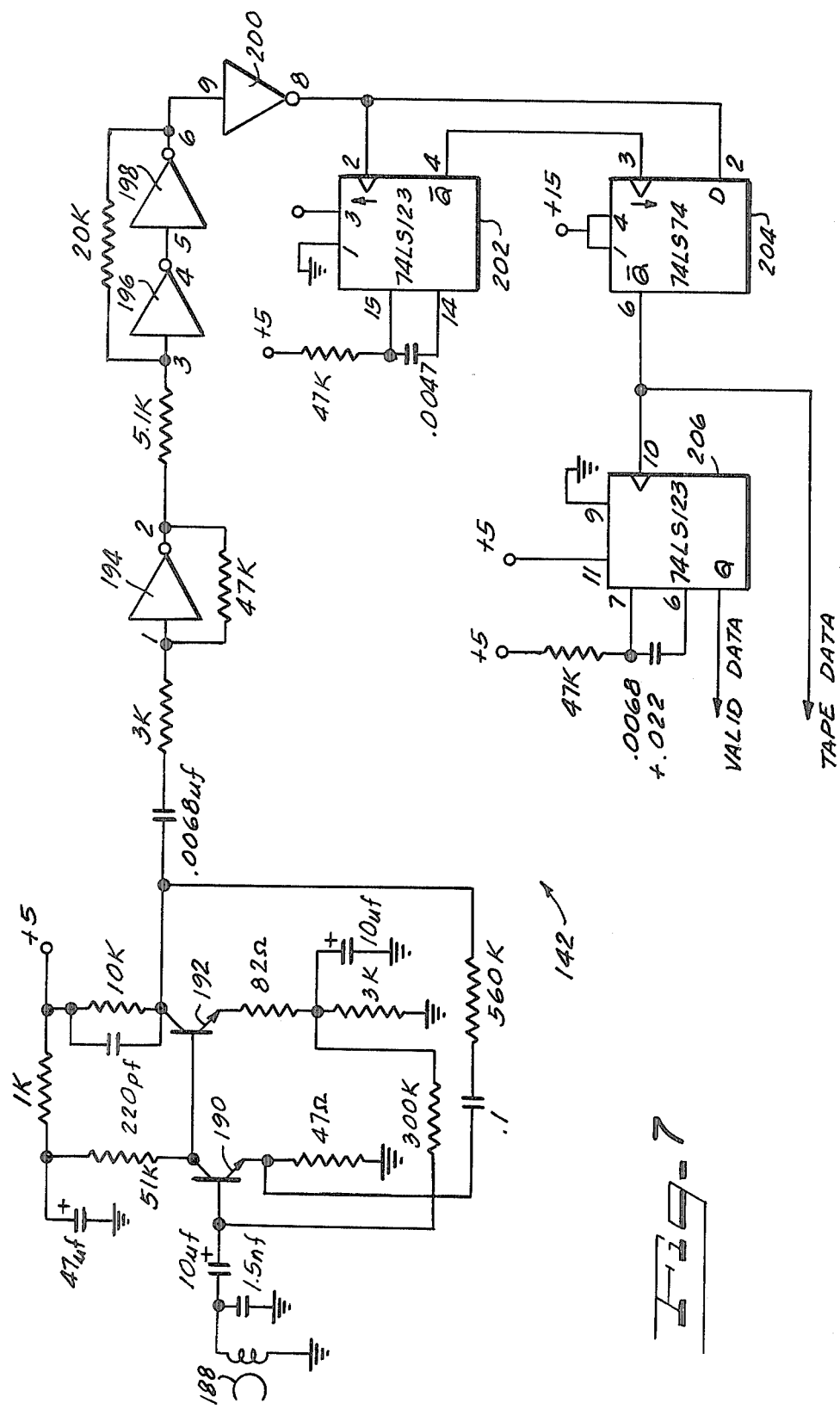
FIG. 7 is a schematic drawing of a decoder for decoding the tape and program location information on the tape of FIG. 3.

As illustrated in FIG. 7, the tone bursts are picked up by a read head 188 and coupled to the input of preamplifier comprising transistors 190 and 192 and their associated circuitry as illustrated. The output of the preamplifier is coupled through four inverters 194, 196, 198 and 200, connected as shown to develop a square pulse at the output of the inverter 200 for each cycle of a tone burst received by the preamplifier.

The square pulses received from the inverter 200 are applied to a pin 2 of a monostable 202 and to the D input of a D-type flip-flop 204. The monostable 202 develops at its $\overline{Q}$ output a single square pulse of a constant duration for each pulse input. Those constant duration pulses are coupled to pin 3 of the flip-flip 204.

The flip-flop 204 is designed to "clock" on each negative going pulse transition received from the monostable 202. As a result, the flip-flop 204 develops at its $\overline{Q}$ output a high level signal whenever the tone bursts sensed by the playback head 188 comprise bursts of 9.6 kilohertz and to develop a low output whenever those tone bursts comprise a 4.6 kilohertz signal. The combination of a high output having a duration of 200 microseconds followed by a low output having a duration of 600 microseconds from the flip-flop 204 is interpreted as a logic 0 and is coupled to the I/O device 106 via the "tape data" line and line 146 (FIG. 6). Conversely, whenever the tone bursts comprise a series of 2 9.8 kilohertz cycles followed by 3 4.8 kilohertz cycles, flip-flop 204 develops at its $\overline{Q}$ output first a high level signal lasting 600 microseconds and then a low level signal lasting 200 microseconds. That combination is interpreted as a logic 1 by the controller. All such logic ones and zeros are received by the controller as the track 62 (FIG. 2) is read by the read head, and the data they represent is stored in memory in the controller. Such data includes the table of contents and all the tape addresses as they are read sequentially along the tape.

The valid data signal which is coupled to the I/O device 106 via lead 144 is developed by another monostable 206 which receives the output of flip-flop 204. Suffice it to say that the monostable 206 develops a negative-going transition at its Q output to indicate the reception of valid data. That negative-going transition is coupled to the I/O device 106 via the "valid data" line and line 144.

Having described the circuitry and interconnections which comprise the controller illustrated in FIGS. 5 and 6, the way in which the controller is programmed to carry out the functions described above will now be described in terms of flow charts by which the controller may be programmed. More details of the operation of the machine 10, as effected by the controller, will be apparent from the discussion of the flow charts.

Figure 8:
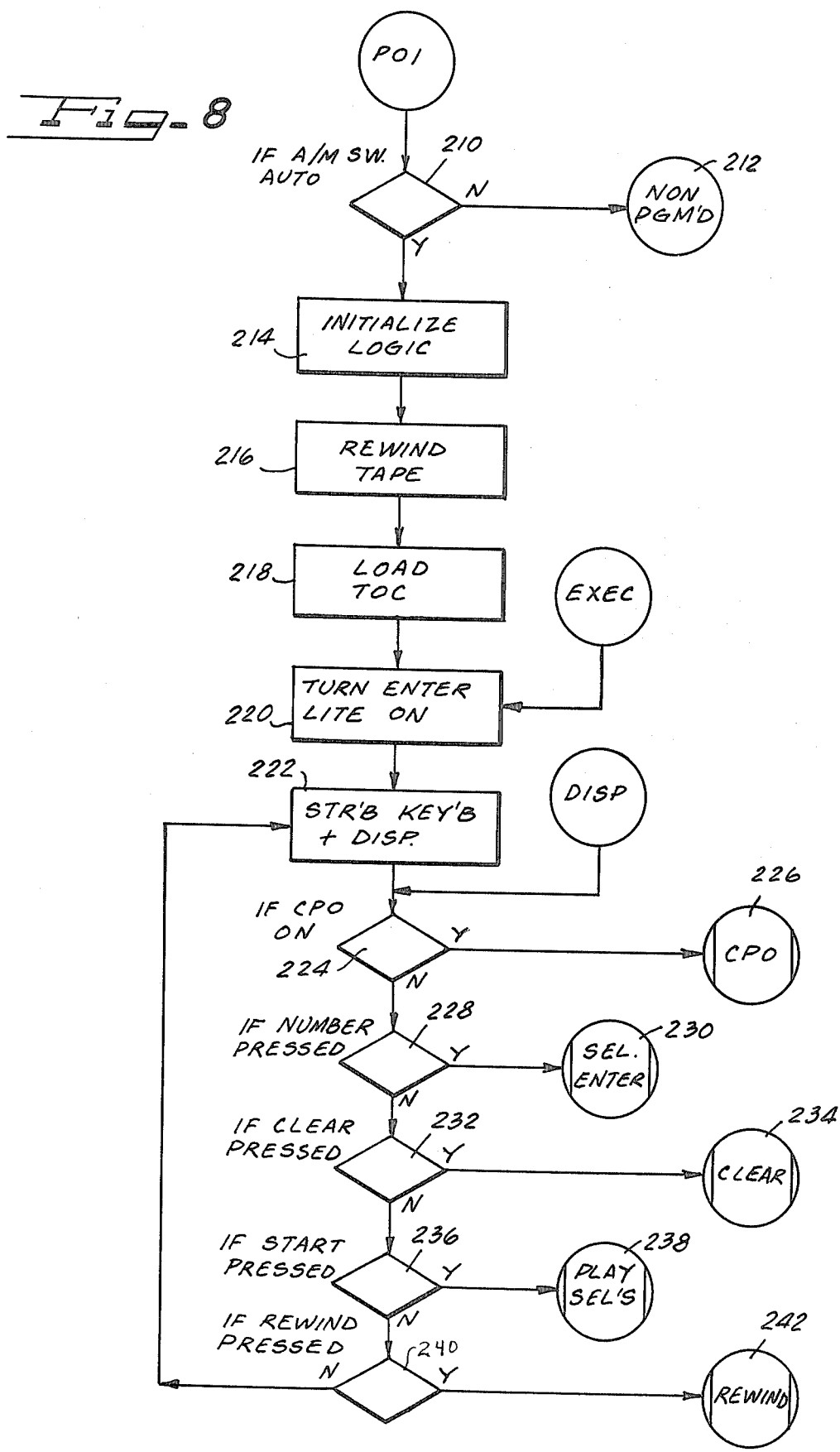
FIG. 8 depicts a generalized flow chart by which the microprocessor is programmed.

The flow chart illustrated in FIG. 8 indicates the overall organization of the program by which the controller carries out the functions of the machine. This program begins at POI (power on interrupt) and then executes instruction 210 to determine if the automatic/manual button is in the automatic position. If the answer is no, the program advances to a non-programmed routine 212 to permit the machine to be operated in a "manual" mode. If the auto/manual switch is in the auto position, the program initializes the logic in the controller (instruction 214), rewinds the tape (instruction 216), and loads the table of contents 66 (instruction 218). The loading of the table of contents takes approximately 5 to 8 seconds. During that time, an operator's manipulation of any of the front panel push buttons will have no effect.

Once the table of contents has been loaded, instruction 220 causes the "enter light" 42 on the display panel 16 to be lighted. This signifies to the operator that the machine is ready to accept program entries. (The notation "EXEC" adjacent instruction 220 indicates an entry point to that part of the program.)

The program then continues to instruction 222 by which the controller strobes the keyboard and the display. (Another entry point into this part of the program is indicated as "DISP"). While the keyboard is being strobed, instruction 224 is executed to determine whether the CPO (custom programming operation) switch 34 has been actuated by the operator. If it has, the program continues to a "custom programming option" routine 226 which is described hereinafter.

If the CPO switch was not pressed, the program continues to instruction 228 to determine whether one of the numbered push buttons on the display panel has been pressed. If it has, the controller interprets this as the entry number of one of the programs listed on the printed table of contents supplied to the operator and recorded on the tape. The program then continues to the "selection entry" routine 230 for processing the number entered by the operator. That routine is so described hereinafter.

If the controller senses that a numbered push button has not been pressed, it proceeds to instruction 232 to determine if the "clear" button has been pressed. If it has, the machine proceeds to a "clear" routine 234 for clearing entries previously made by the operator. Such a routine is well known in the art and is not discussed further.

If the "clear" button has not been pressed, the program continues to instruction 236 to determine if the "start" button has been pressed. The depression of that button indicates the operator's desirability for the machine to replay the programs selected by the operator, whereupon the program continues to "play selections" routine 238 for playing the operator's selection. The latter routine is described in detail hereinbelow.

The next instruction in sequence is instruction 240 which inquires whether the "rewind" button on the display panel has been pressed by the operator. If it has, the program continues to a "rewind" routine 242 which is also described hereinafter. If the answer to that inquiry is no, the program returns to instruction 222 and loops through instructions 222 to 240 to look for a depressed key.

As mentioned above, instruction 218 causes the controller to load the table of contents. To achieve that loading, the controller first starts the tape moving in the machine and then looks for the header associated with the table of contents. After reading the header, the single byte code indicating that a table of contents follows is read, whereupon the sequential program addresses which are included in the table of contents are read and stored in the controller's memory. After reading the addresses in the table of contents, the controller adds, in modulus 256, the bytes associated with each program address in addition to the single byte code referred to above. The controller then develops a check sum digit and compares that developed digit with the check sum digit which it read after the table of contents. If the comparison between the developed check sum digit and the read check sum digit indicates that those digits are the same, this is an indication that all the addresses were properly read.

Immediately following the program addresses in the table of contents, there may be included a signal indicative of the end of the table of contents. That signal may be in the form of tone bursts which, when decoded, comprise two OF's (Hexidecimal).

Figure 9:
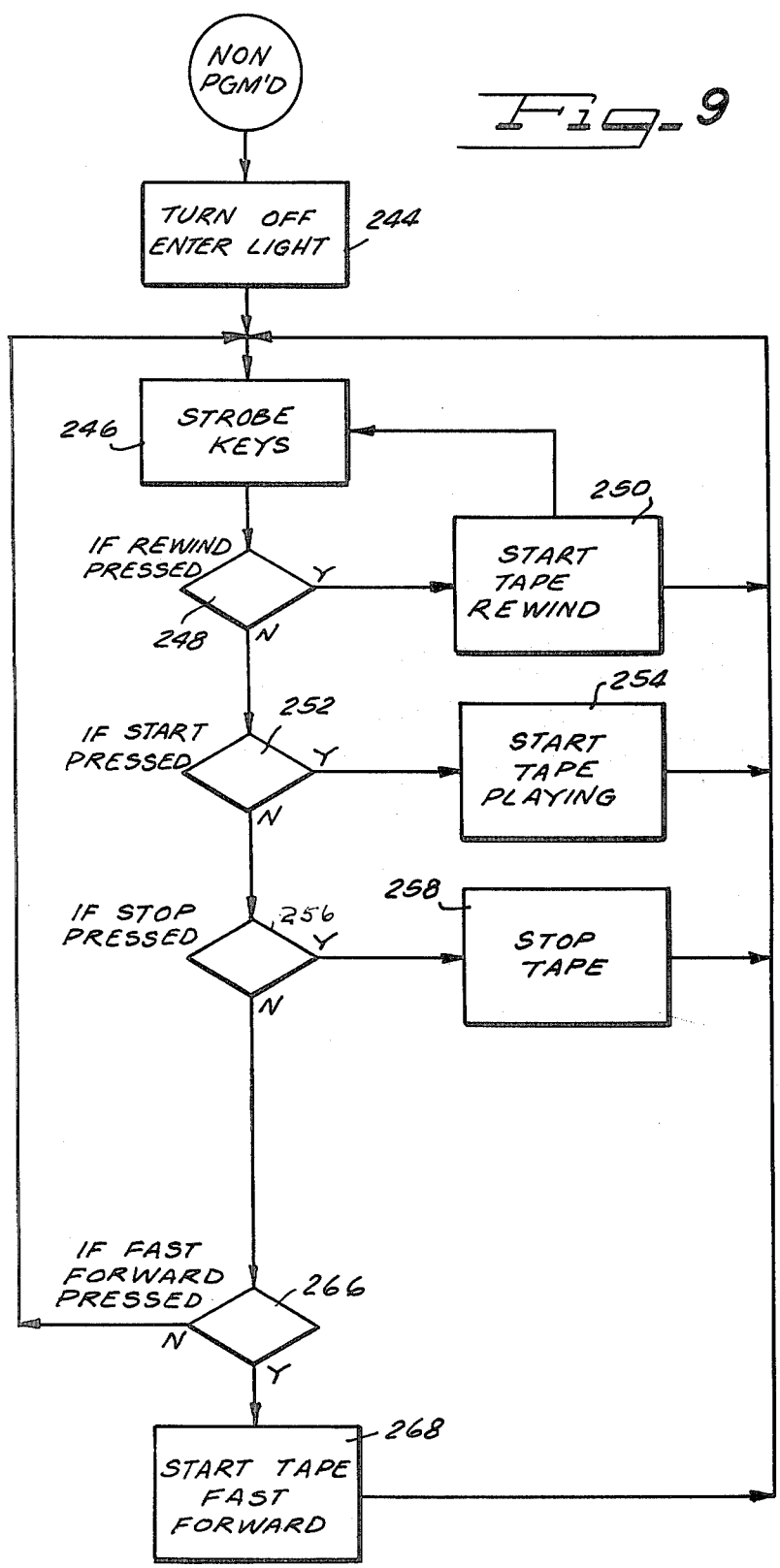
FIG. 9 is a flow chart of a "non-programmed" routine shown generally in FIG. 8.

Referring now to FIG. 9, there is shown a flow chart of the "non-programmed" routine 212. As indicated, this routine begins with instruction 244 which causes the processor to turn off the "enter" light 42 on the display panel 16. Next, the program causes the processor to strobe the push buttons or keys on the display panel to determine if the "rewind" button has been pressed (instructions 246 and 248). If the rewind button has been pressed, the program continues to instruction 250 to start the tape rewind motor. The program loops through instructions 246, 248 and 250 as long as the rewind button is pressed.

When the rewind button is not pressed, the program continues to instruction 252 to determine if the "start" button has been pressed. If it has, the program continues to instruction 254 to initiate playing of the tape. Thereafter, the program returns to instruction 246 to continue strobing the keys.

If the "start" button is not pressed, the program advances to instruction 256 to determine if the "stop" button is pressed. If it is, the machine is instructed to stop the tape (instruction 258), and the program then returns to instruction 246 to strobe the keys once again.

If instruction 256 determines that the "stop" button is not pressed, instruction 266 is executed to determine whether the "fast-forward button" is pressed. If it is, instruction 268 causes the fast-forward motor to energize for advancing the tape in the fast-forward mode. The program then returns to instruction 246 to continue strobing the keys.

The flow chart of FIG. 9 indicates that the controller does actuate the machine when the latter is in the manual mode. However, in that mode, the rewind, start and fast-forward buttons are all actuated by the operator. This is in contrast to the "automatic" mode wherein those buttons are actuated by the controller.

Figure 10:
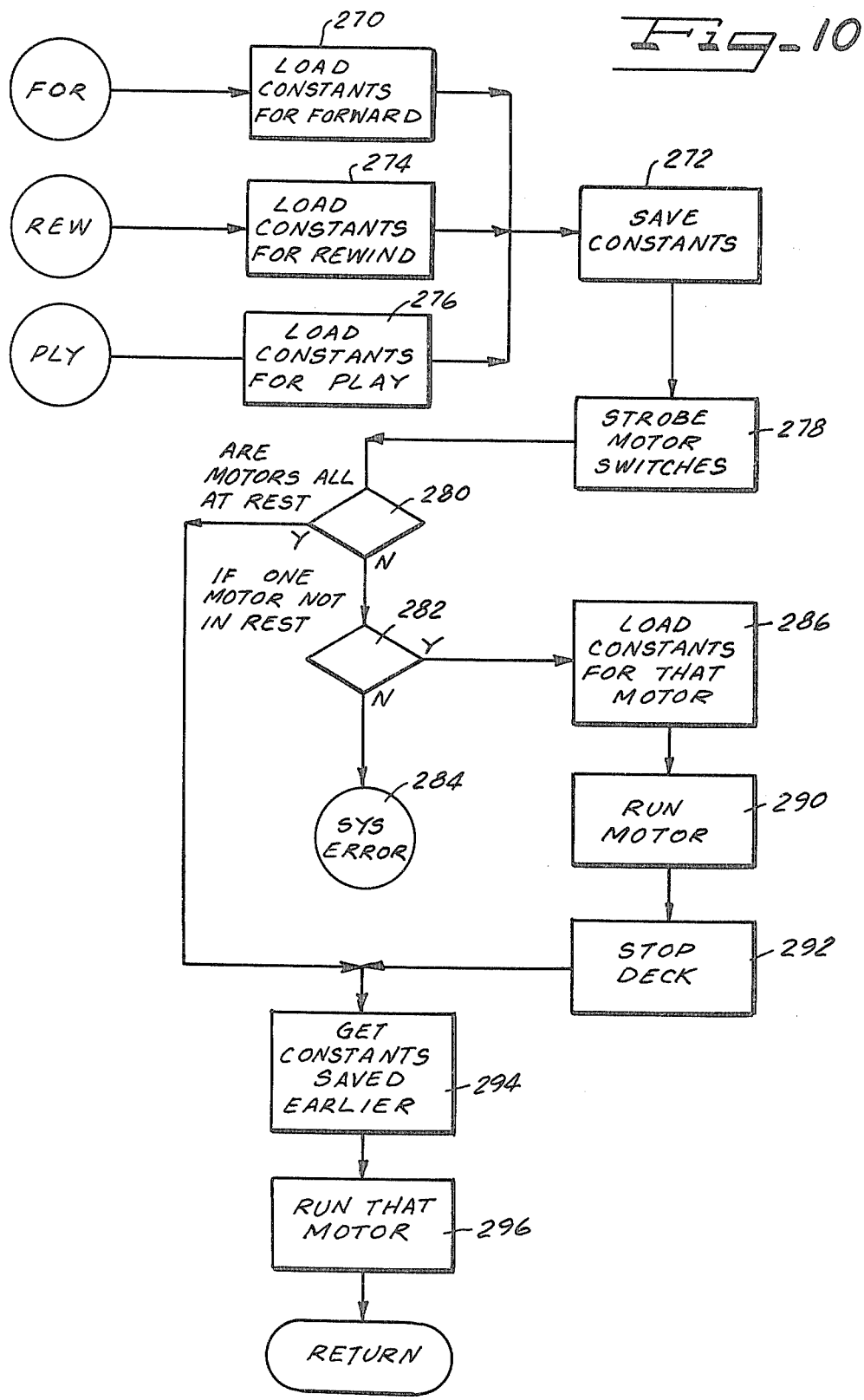
FIG. 10 is a flow chart of a routine for actuating a selected motor and push-button in the machine of FIG. 1.

It is clear that many of the instructions by which the controller is programmed instruct the controller to run a particular motor for actuating the rewind, play or fast-forward push buttons. An exemplary routine for effecting the actuation of a particular motor is shown in FIG. 10. As indicated, this routine is entered whenever the program calls for the forward, rewind or play button to be actuated. Assuming that the program calls for the fast-forward button to be actuated, instruction 270 instructs the controller to "load contents for forward". The contents referred to are signals from pins 5, 6 or 39 of the I/O device 106, which signals indicate to the controller the proper line to turn on to run a particular motor. Hence, by executing instruction 270, the controller receives the necessary information to actuate the proper motor and, by instruction 272, saves those constants. Similar instructions 274 and 276 are executed when rewind and play, respectively, are called for.

After the constants have been determined and saved, the motor switches 86a, 86b and 86c are strobed (instruction 278) to determine whether all the motors 48, 50 and 52 are at rest. If all those motors are not at rest, the program advances to instruction 282 to determine if only one motor is not in its rest position. If the answer to that inquiry is no, i.e., more than one motor is not in the rest position, that condition is improper. Hence the program continues to instruction 284 for stopping or shutting down the machine and for advising the operator that a system error has occurred. Preferably, the controller energizes one of the LED displays on the display panel 16 with a message indicating that a system error has occurred.

Returning to instruction 282, if the execution of that instruction indicated that only one motor was not in a rest position, the program continues to instruction 286 for loading the constants of the motor which is not in the rest position (not constants of the motor initially called on for energization). When the latter constants have been obtained, the motor found not to be in the rest position is actuated by instruction 290 and the machine is then stopped (instruction 292).

In the situation where the execution of instruction 280 indicates that all the motors are in the rest position, the program advances from instruction 280 to instruction 294 for retrieving the constants previously saved by instruction 272 and for then running the motor identified by the constants (instruction 296). Thereafter, the program returns to that point in the program from which exit was made to the motor run routine of FIG. 10.

At this juncture, it should be noted that in running the motor, as by instruction 296, it is preferable to sense whether that motor responds to actuation within a predetermined interval to determine whether that motor is stuck. This may be achieved by first initializing a timer in the controller such as by setting three bytes of memory to some predetermined number. Then the motor in question is turned on and the memory bytes are decremented to zero. If the motor does not rotate prior to the three memory bytes being decremented to zero, the assumption is made that the motor is stuck and an indication of system error is given.

An additional feature of the machine 10 is its ability to replay, in any selected format, designated portions of the tape other than those programs listed in the operator's index and designated in the table of contents of the tape. Specifically, the custom programming option (CPO) allows the operator to view the contents of the tape as it is being shown on a television monitor, for example, and to determine from that viewing which segments the operator wishes to replay. To designate one or more tape segments for replay, the operator merely notes the tape address indicated by the tape position display 19 when the operator comes upon a tape segment he wishes to replay. The number which is displayed in the display 19 is then used and noted as the starting address of the selected tape segment. The operator continues viewing the film until he finds a portion thereof which he wishes to designate as the end of that film segment. Once again, the operator notes the numbers displayed in the tape position display 19 and uses those numbers as the stopping address of the selected tape segment. In the embodiment described herein, the operator may select up to 4 tape segments for replay, irrespective of their position on the tape, by noting the starting and stopping addresses of those tape segments as they are indicated on the tape location display 19. When the operator wishes to have those tape segments replayed, he presses the CPO button 34 and presses the numbered program selection keys 20 which correspond to the starting and stopping addresses of the tape segments he wishes to be replayed. Such an option is described in detail in copending application Ser. No. 946,989, filed Sept. 29, 1978, and entitled "Variable Format Tape Replay System", assigned to the assignee of this invention. The way in which that option is carried out in this embodiment will become more apparent from a description of the flow chart of FIG. 11 which illustrates the details of the CPO routine.

Figure 11:
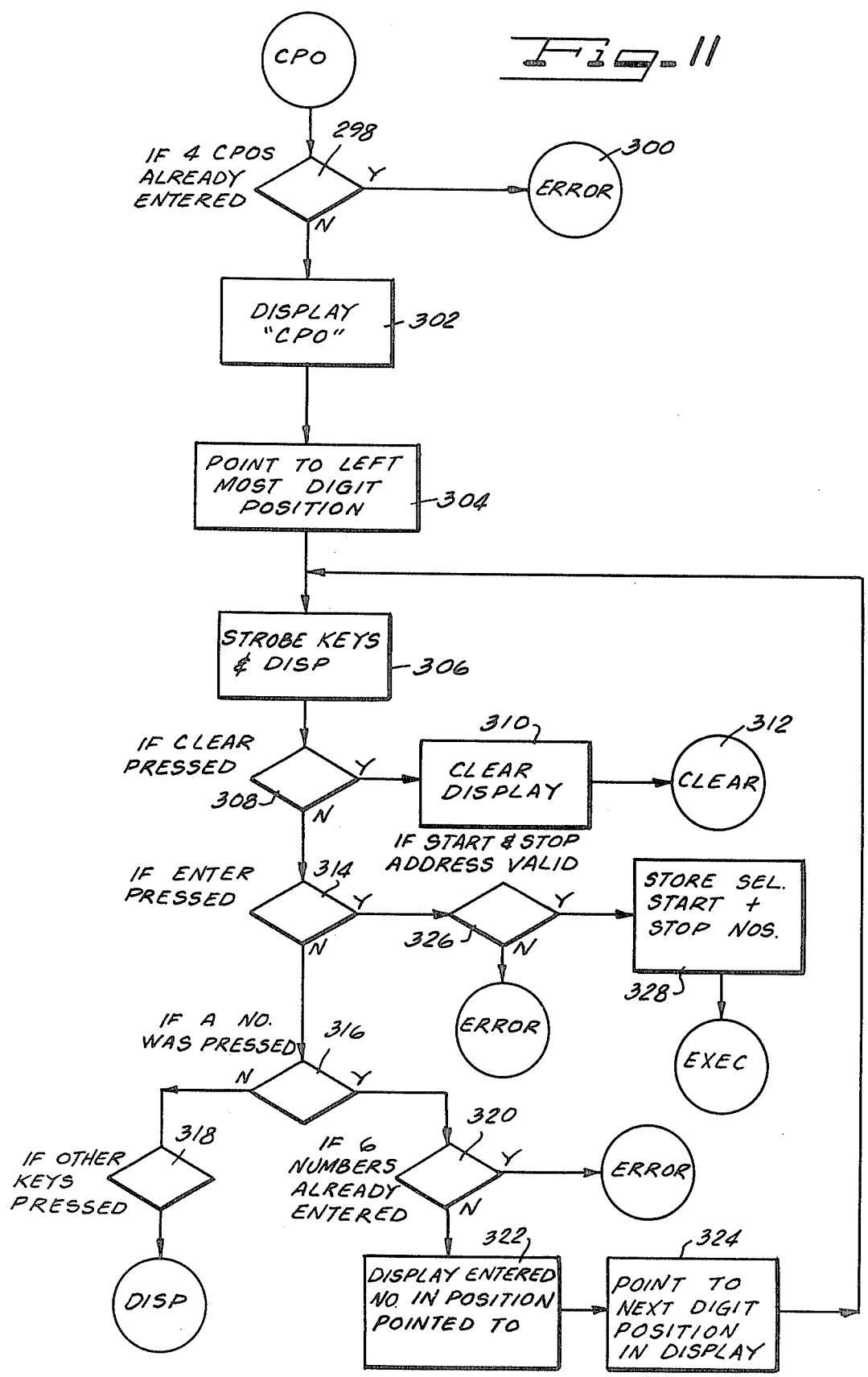
FIG. 11 is a flow chart of a "custom programming option" routine system shown generally in FIG. 8.

Referring to FIG. 11, instruction 298 causes the controller to determine whether four "customized" tape selections have already been made. If they have, and assuming that the controller is capable of handling only four such selections, the program advances to instruction 300 to indicate that an error has been made.

In the event that four entries have not been made, the program advances to instruction 302 for energizing one of the LED displays with "CPO" to indicate to the operator that the CPO mode is in effect. Next, instruction 304 causes an internal pointer in the controller to point to a leftmost digit position, after which instruction 306 causes the controller to strobe the keys and the LED display. If strobing the keys indicates that the clear button is pressed (instruction 308), the program advances to instruction 310 for clearing the display and then for clearing any entries previously made (clear routine 312).

If the clear button was not pressed when instruction 308 was executed, the program advances to instruction 314 to determine if the enter button is pressed. At this juncture, it should be pointed out that the procedure for an operator starting and stopping addresses of a selected tape segment is to first enter a 3 digit starting address for a selected tape segment and then a 3 digit stopping address for the selected tape segment. Such entry is via the numbered buttons 20 on the keyboard. The digits of each address are displayed on the tape position display 19 as they are entered. After entering the starting and stopping addresses, the operator then presses the enter button to cause the entered addresses to be checked for validity and, if valid, to be stored.

Assuming that the operator has not yet pressed the enter button, the program advances to instruction 316 to determine if one of the numbered buttons 20 was pressed. If no button is detected as being pressed, the program advances to instruction 318 to determine if any other button on the panel has been pressed, and then returns to instruction 224 (FIG. 8) via the DISP entry point.

If the execution of instruction 316 indicated that a numbered button was pressed, the program would advance to instruction 320 to determine if six numbers or digits had already been entered. If they had, the program detects an error because only three starting digits and three stopping digits are permitted. If no error was made, the program continues to instruction 322 to display the last entered number in the position pointed to by the controller's internal pointer. On the first pass through this program, the internal pointer will be pointing to the left-most digit position called for by instruction 304. Next, instruction 324 instructs the controller to direct the internal pointer to the next digit position, whereupon the program returns to instruction 306 for again strobing the keys and the display.

After the operator has entered the six digits corresponding to the starting and stopping addresses of a single selected tape segment, he presses the enter button, whereupon instruction 314 causes the program to advance to instruction 326 to determine whether the starting and stopping addresses entered are valid. An example of an invalid address would be one which is greater in number than the number of addresses actually on the tape. The processor then executes instruction 328 for storing the selected starting and stopping numbers, and then returns to instruction 220 (FIG. 8) via the EXEC entry point. In this embodiment, the starting and stopping address of up to three more tape segments may be entered as described above.

To replay the tape segments whose starting and stopping addresses were entered under the "custom programming option", instruction 328 causes the controller to assign selection numbers to each tape segment selected. For example, if the operator selects for replay four programs recorded on the tape and also selects three tape segments by entering the starting and stopping addresses of those segments, the controller may assign selection numbers 1-4 to the four selected programs and selection numbers 5-7 to the selected tape segments. The way in which each selection (program or tape segment) is replayed is discussed below in connection with the "play selections" routine.

Figure 12:
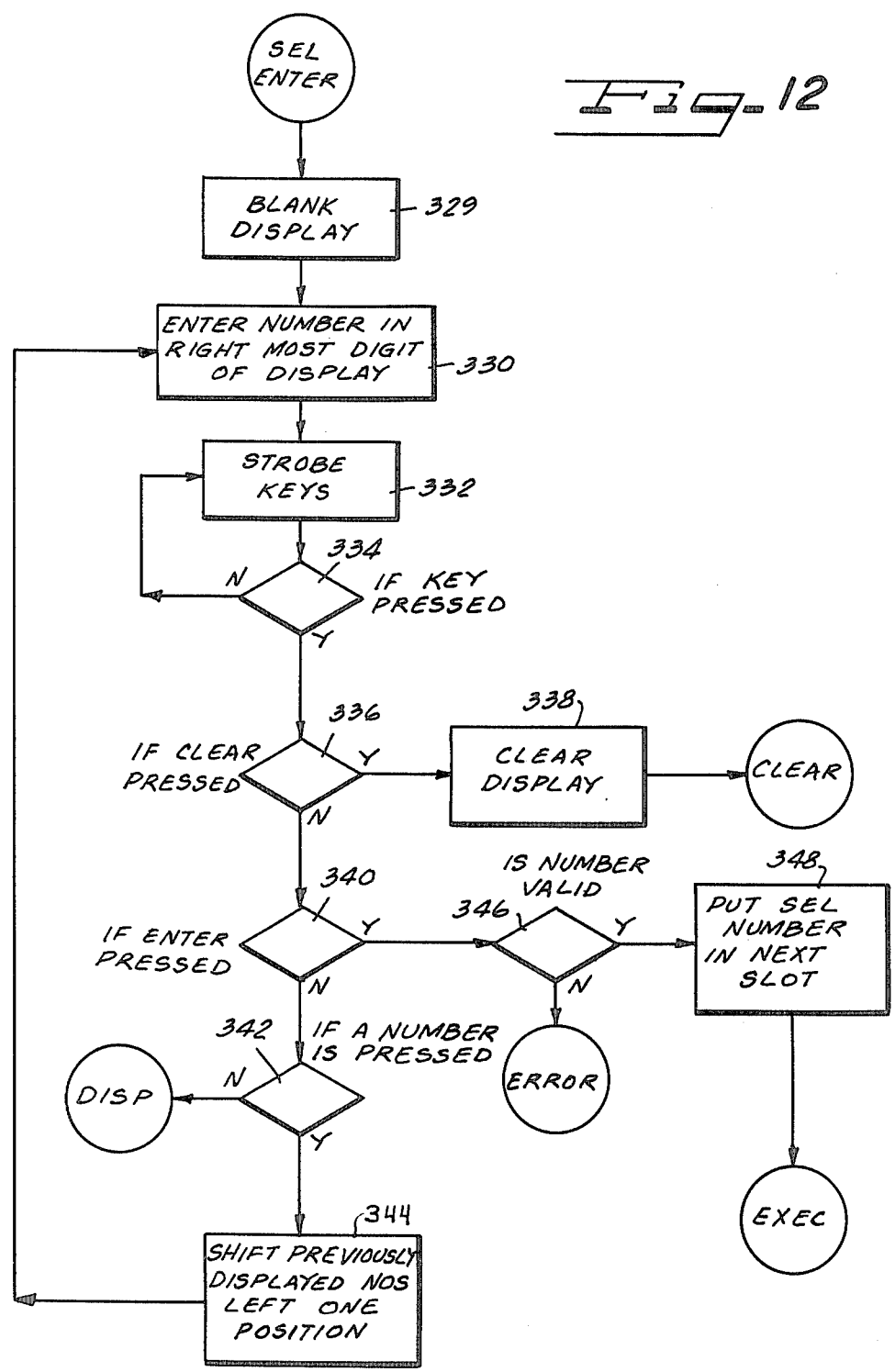
FIG. 12 is a flow chart of a "selection enter" routine shown generally in FIG. 8.

In the case where the machine is not being operated under the "custom programming option" because the operator has pressed one or more of the numbered push buttons 20 to indicate which prerecorded programs on the tape he wishes to use (as chosen from the printed index), the processor then executes the "selection enter" routine 230 which is illustrated in FIG. 12. According to this routine, the processor causes the program display 18 to display the numbers (i.e. 1-150, for example) of the programs which were selected for replay, and stores those numbers sequentially for playing in the sequence in which they were entered.

According to instruction 329, the program display 18 is first blanked, after which instruction 330 instructs the processor to enter the selected program number into the rightmost digit of the display. Of course, on the first pass through this part of the program, there are no numbers to display because the processor has not yet sensed the entry of any number.

Next, the processor is instructed to strobe the keyboard keys (instruction 332) to determine if any key is pressed (instruction 334). The program continuously loops through instruction 332 and 334 until it detects that a key has been pressed. If that key which is pressed is the clear key, (instruction 336), the program advances to instruction 338 for clearing the program display and clearing previously entered numbers.

When the clear button is not detected as being pressed, the instruction 340 determines whether the enter button has been pressed. On the first pass through the program the enter button will not yet be pressed, wherefore the program proceeds to instruction 342 which asks whether a numbered key is pressed. If not, the program returns to instruction 224 (FIG. 8) via the DISP entry point. If a number is pressed, the program advances to instruction 344, the execution of which causes the numbers in the LED program display 18 to be shifted left by one position. The program then loops through instructions 330 to 344 until the operator presses the enter button, whereupon instruction 346 is executed to determine whether the number just entered is valid. If it is not valid, an error has been committed. If it is valid, the program advances to instruction 348 for putting the entered selection number in the next slot in the memory. In other words, the entered selection numbers are placed in sequential order so that the programs may be replayed in the sequence in which they were entered. After executing instruction 348, the program returns to instruction 220 via the entry point EXEC. As the operator enters further program selection numbers, the "selection enter" routine is re-executed to display and store those selected numbers.

Figure 13:
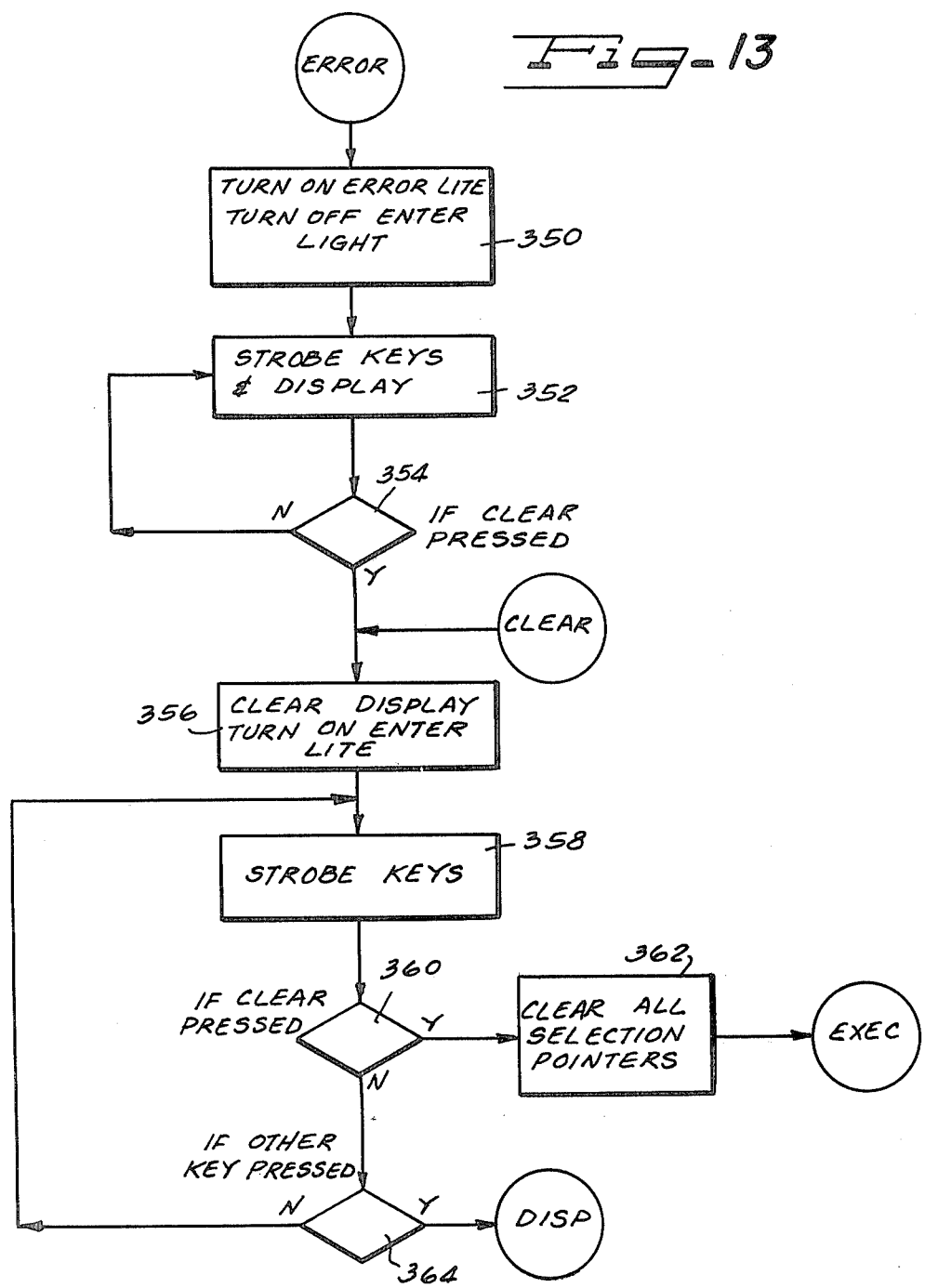
FIG. 13 is a flow chart of "error" and "clear" routines shown generally in FIG. 12.

The "error" and "clear" routines referred to in the flow chart above are shown in more detail in FIG. 13. The error routine begins with instruction 350 for turning on the error or "incorrect entry" light 44 on the display panel 16 and for turning off the enter light 42. Instructions 352 and 354 then cause the processor to loop through those instructions until the clear button 36 is pressed. When that occurs, instruction 356 causes the program display 18 to be cleared and the enter light 42 to be turned on.

Instruction 356 and the subsequent instructions of FIG. 13 are also executed whenever the "clear" routine is called for. After executing instruction 356, the controller again strobes the keyboard (instruction 358) to determine if the clear button is pressed (instruction 360). If it is, all internal selection pointers are cleared (instruction 362) and the program returns to instruction 220 via the EXEC entry point. If the execution of instruction 360 did not detect the pressing of the clear button, the program advances to instruction 364 to determine if any other key is pressed. If not, the program continues looping through instructions 358-354 waiting for a button to be pressed. When a key other than the clear key is pressed, the program returns to instruction 224 via the entry point DISP.

Figure 14:
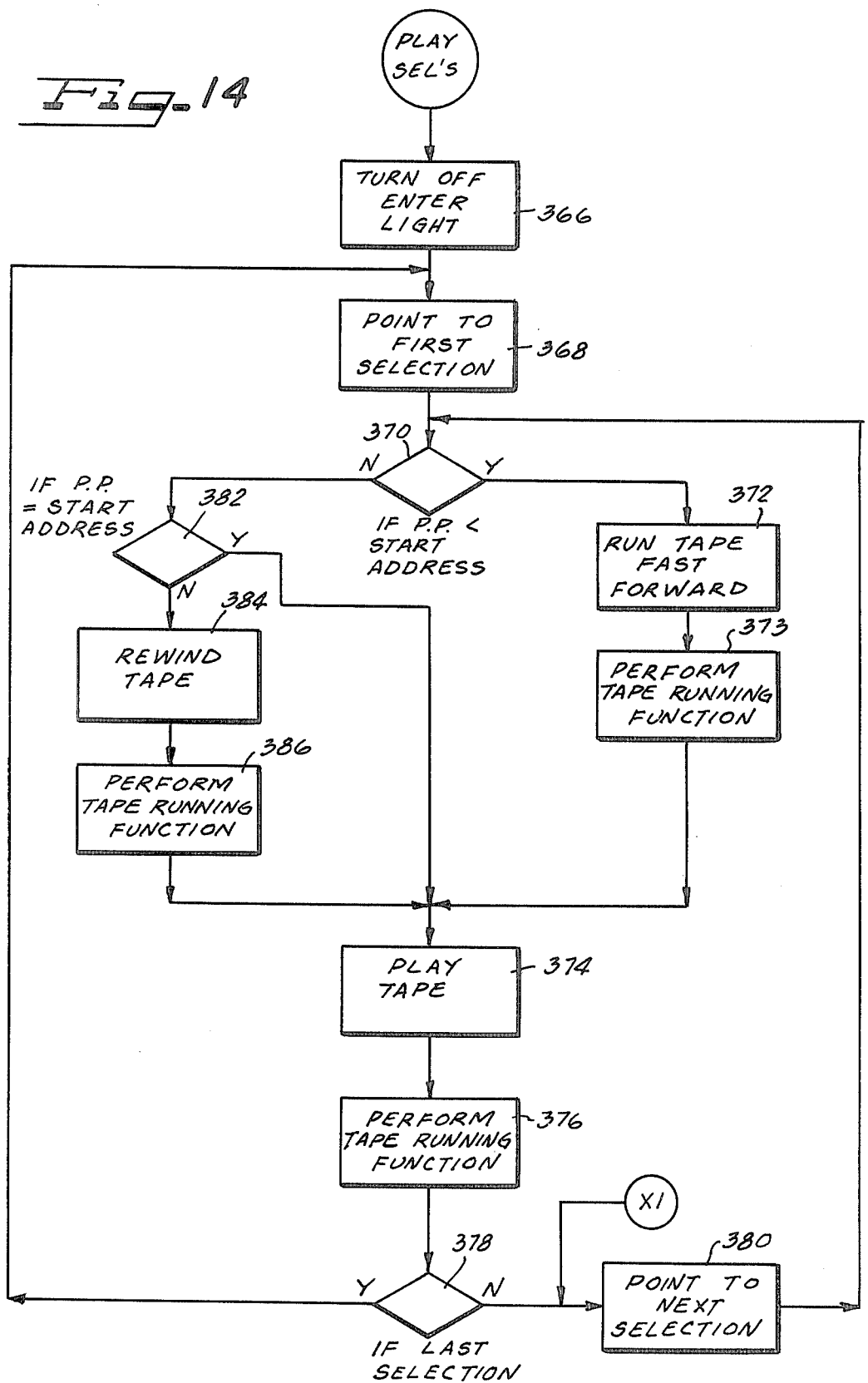
FIG. 14 is a flow chart of a "play selection" routine shown generally in FIG. 8.

The discussion immediately below describes the sequence of events which occur after the operator has entered the numbers corresponding to all the selected tape programs and has pressed the start button 24. When that button is pressed, the play selections routine shown in FIG. 14 is executed.

The play selection routine begins with instruction 366 for turning off the enter light 42. Next, the processor is instructed to direct an internal pointer to the first tape selection requested by the operator (instruction 368). As stated earlier, a selection may be either a program number or a tape segment chosen by the entry of its starting and stopping addresses. Whatever the entry, such entries are played in the order in which they are entered and instruction 368 causes the controller to "point to" the first such entry, irrespective of which kind it is.

The next instruction, 370, causes the controller to determine whether the present position of the tape, i.e., the address of the tape at the play head, is less than the starting address of the first tape program selected for replay. If the present position of the tape is, indeed, less than that starting address, the program advances to instruction 372 for advancing the tape in a fast-forward mode toward the starting address of the first selected tape program. While the tape is running in the fast-forward mode, instruction 373, a tape running function or routine, is executed. Instruction 373 is described in more detail hereinafter. Suffice it to say that the execution of this instruction causes the processor to update its knowledge of where the tape is while it is being run in the fast-forward mode, and to stop the tape when it arrives at the starting address of the selected tape segment. When that starting address is reached, instruction 374 is then executed to begin the replay of the tape at the selected tape program.

Next, instruction 376 again causes the tape running function to be executed. Briefly, that tape running function again causes the controller to update its knowledge of the present position of the tape and to stop the tape at the stopping address of the first selected program. When that occurs, instruction 378 inquires as to whether the last selected tape program has been played. If not, the program advances to instruction 380 for causing an internal pointer to point to the next selection for replay thereof.

Upon executing instruction 370, if the controller determines that the present position of the tape is not less than the starting address of the program selected, the program advances from instruction 370 to instruction 382 to determine if the present position of the tape is equal to the starting address of the selected tape program. If it is, the program advances immediately to instruction 374 for playing that selected tape program from its starting address to its stopping address.

If the present position of the tape is not equal to the starting address of the selected tape program, instruction 384 is executed for rewinding the tape, and a tape running function (instruction 386) is executed for updating the processor's knowledge as to the position of the tape during the rewind and for stopping the tape when the tape arrives at the starting address of the selected tape program. When that occurs, instruction 374 is executed to play the selected tape program.

Figure 15:
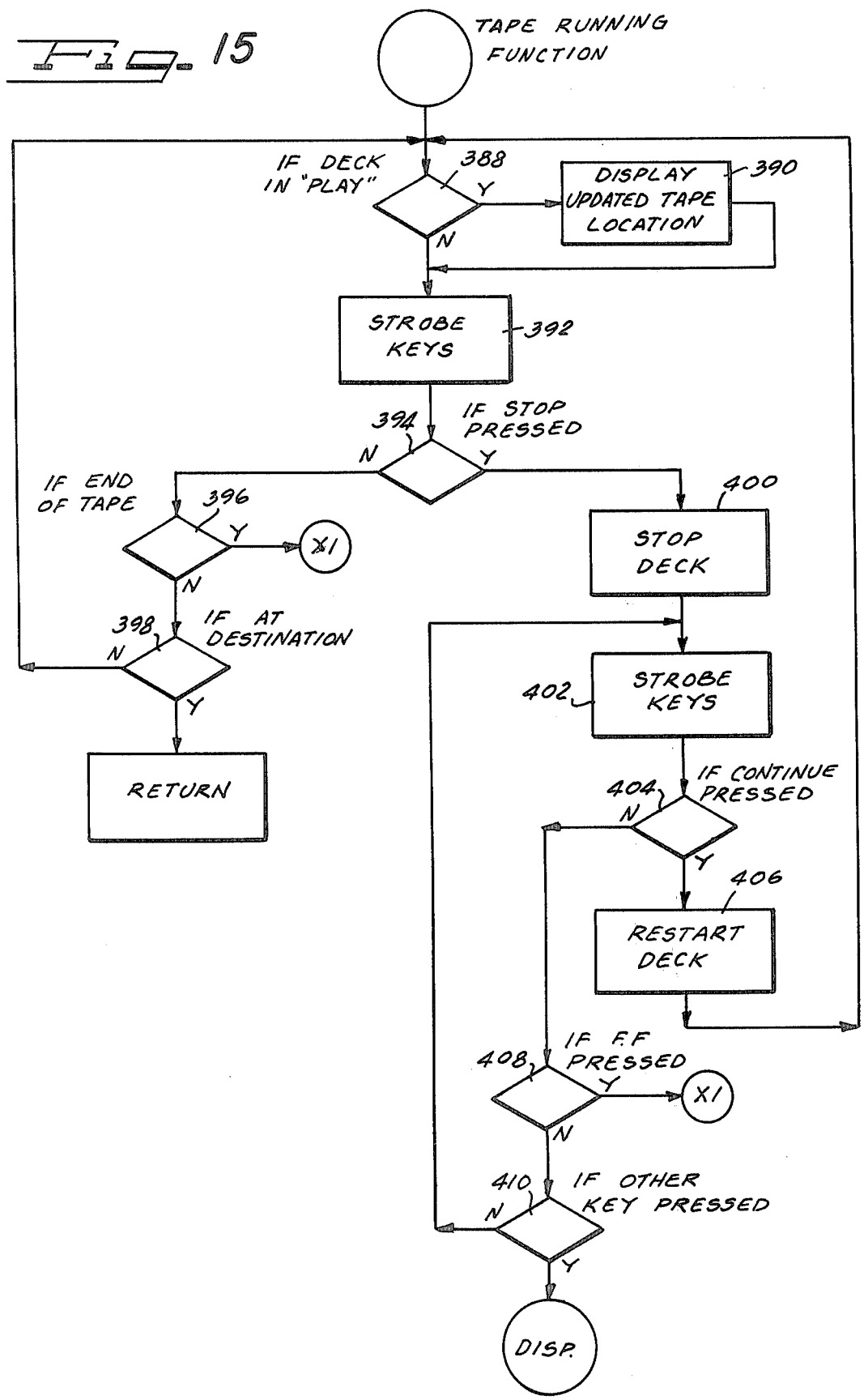
FIG. 15 is a flow chart of a "tape running" routine shown generally in FIG. 14.

Details of the tape running function (routine) referred to in connection with FIG. 14 is shown in FIG. 15. This routine begins with instruction 388 for first determining if the deck or machine is in the "play" mode. If the machine is in the play mode, the controller is then reading addresses from the tape and updated tape location information is displayed on the tape position display 19 (instruction 390).

Whether the deck is in "play" or not, instructions 392 and 394 are then executed for strobing the keyboard to determine whether the stop button has been pressed. If the stop button has not been pressed, instruction 396 is executed to determine whether the end of the tape has been reached. If it has, the selected program or tape segment has not been found, and the program returns to instruction 380 (FIG. 14) via entry point X1 to point to the next selection. Normally, of course, the selection will be found, and the program will advance to instruction 398 to determine whether the tape is at the desired destination. Specifically, when the machine is in the fast-forward or rewind mode, the desired destination is the starting address of the tape segment or program selected. When the machine is in the play mode, the desired destination is the stopping address of the tape program or segment then being replayed. If the desired destination is found, the program returns to that point in the play selection routine of FIG. 13 from which it exited to the tape running function (routine). If the desired destination is not reached by the execution of instruction 398, the program returns to instruction 388 to continue looping through instruction 388 to 398 until the desired destination is found.

Referring again to instruction 394, if the stop button is pressed, the program will advance from instruction 394 to instruction 400 for stopping the deck and for strobing the keyboard (instruction 402). Instruction 404 determines whether the continue button is pressed. If it is, the deck is restarted (instruction 406) and the program returns to instruction 388 for advancing the tape to the desired destination.

If by the execution of instruction 404 it is determined that the continue button is not pressed, the program advances to instruction 408 to determine if the fast-forward button is pressed. If it is, the pressing of the fast-forward button (in this part of the program) is taken as in indication that the operator wishes to discontinue searching for the program under search and to search for the next successive selected program (or tape segment). Hence, the program advances from instruction 408 to instruction 380 of FIG. 14 via entry point X1 for advancing to the next program selected.

If execution of instruction 408 indicates that the fast-forward button was not pressed, instruction 410 determines whether any other key was pressed; if it was, the program returns to instruction 224 (FIG. 8) via the entry point DISP. Alternately, if no other key was pressed, the program returns to instruction 402 to continue looking for the depression of a key.

As previously indicated, the tape addresses 71 are read sequentially when the machine is in the play mode. A "read location" routine for instructing the controller to read those addresses is illustrated in FIG. 16. As shown, the "read location" routine begins with a "read header" instruction 412 for reading the header associated with a tape address. By instruction 414, the tape address is read, whereupon instruction 416 causes the check sum following that address to be read. If the processor determines that the check sum is valid, the program advances to instruction 420 for instructing the processor to update its tape location information to reflect the value of the tape address just read at instruction 414. The program then returns to instruction 412 for executing the "read location" routine as each tape address is encountered during the play routine.

If the execution of instruction 418 indicates that the check sum is invalid, the program does not update its tape location information, but returns to instruction 412 for again reading the header, address and the check sum.

It will be appreciated that the "read location" routine is executed whenever a tape address is read, irrespective of where the controller is in the program.

It will be recalled that the processor keeps track of tape positions when the machine is in the fast forward or rewind mode by counting pulses generated by the pulse generator 140. Those pulses are fed to the processor 98 on a non-maskable interrupt line to insure that the processor counts those pulses whenever they are received, irrespective of where the controller is in the overall program. The routine for instructing the controller to count those pulses is illustrated in FIG. 17.

As shown, the pulse counting routine is entered from entry point NMI to indicate the non-maskable interrupt aspect of this routine. The first instruction 422 determines whether the tape is moving in a forward direction. If it is, the controller increments its tape location information as pulses are received (instruction 424). If the tape is moving in the reverse direction, instruction 426 causes the controller's tape location information to be decremented. After having either decremented or incremented the tape location information, instruction 428 is executed to cause the controller to return to that point in the overall program from which it entered the pulse counting routine.

A brief routine for effecting rewind of the tape is illustrated in FIG. 18. As shown, this routine starts with instruction 430 to begin rewind of the tape. Next, instruction 432 determines whether the beginning of the tape has been reached, that is, whether the tape has been fully rewound. If it has, the program returns to instruction 220 (FIG. 8) via the EXEC entry point.

If the beginning of the tape has not been reached when instruction 432 is executed, the program advances to instruction 434 for strobing the keys and the displays, and then a determination is made as to whether the stop button has been pressed (instruction 436). If that button has been pressed, the program continues to the stop tape instruction 438 for stopping the tape, and then returns to instruction 220 via the EXEC entry point.

If the stop button was not detected as being pressed when instruction 436 was executed, the program continues looping through instructions 430 through 436 until either the beginning of the tape is reached or the stop button is pressed.

It will be appreciated that the system described herein allows an operator to format the tape for replay of selected portions of the tape in any sequence. Those selected tape portions may be individual programs recorded on the tape or other segments of the tape not indexed as programs. Alternately, the selected tape segments may be portions of individual programs.

Further, the system described allows an operator to change his previous selections easily and quickly. Moreover, a conventional tape replay machine may be modified to incorporate this system as an "add on" without substantial redesign of the machine.

Although the invention has been described in terms of a specific embodiment, it will be obvious to those skilled in the art in light of this disclosure that many alterations and variations thereto may be made without departing from the spirit and scope of the invention. Accordingly, it is intended that all such modifications and alterations be included within the scope of the invention as defined by the appended claims.

What is claimed is:

1. In a tape playback machine, a system for selecting and replaying desired segments of a recorded tape in any predetermined sequence comprising:
   means for reading a tape having encoded thereon a plurality of programs, tape location indicia, and program location information correlating the position of the programs on the tape with the tape location indicia;
   operator-actuable means for selecting programs for replay and the sequence in which the selected programs are to be replayed; and
   controller means responsive to said operator selection for determining from said program location information the location on the tape of said selected programs and for actuating the playback machine to replay the selected programs in the sequence selected,
   whereby selected programs on the tape are replayed in any desired sequence, irrespective of their location on the tape.

2. A system as set forth in claim 1 wherein said tape location indicia comprises tape addresses spaced from each other along a lengthwise dimension of the tape at predetermined intervals.

3. A system as set forth in claim 2 wherein said program location information comprises a list of tape addresses at which the programs begin and end on the tape.

4. A system as set forth in claim 2 including means adapted to receive and store operator-designated tape addresses corresponding to starting addresses and stopping addresses of segments of the tape selected for replay, said designated tape addresses corresponding to said tape addresses encoded on the tape, and wherein said controller means is adapted to actuate the playback machine to replay each selected tape segment from its designated starting address to its designated stopping address, whereby any portion of the tape is replayed in response to operator selection.

5. A system as set forth in claim 1 wherein said tape location indicia and said program location information comprise audio tones on the tape.

6. A system as set forth in claim 5 wherein said reading means includes means for translating said tones to electrical signals in the form of logical data.

7. A system as set forth in claim 1 wherein the playback machine includes means for generating signals representative of tape location and a read head for reading the tape, wherein the playback machine is adapted to remove the tape from the read head during high speed transport of the tape and to engage the tape with the read head for replay of the tape, and wherein the system includes means for sensing said signals when the tape is transported at a high speed to determine the location of the tape, and wherein said reading means reads the tape location information from the tape during replay thereof, whereby the location of the tape is constantly sensed, irrespective of whether the tape is being replayed or transported at a high rate of speed.

8. A system as set forth in claim 7 wherein said signals comprise pulses generated in synchronism with tape transport, the number of pulses generated being representative of the amount of tape transported, wherein said sensing means counts said signals during high speed transport of the tape, wherein said tape location indicia comprises tape addresses of different values located at spaced locations along the length of the tape, and wherein the value of a tape address at any predetermined location on the tape corresponds to a function of the number of signals generated to arrive at said predetermined location during high speed transport of the tape, whereby the location of the tape is known during high speed transport by counting said pulses and a corresponding location of the tape is known during replay by reading said tape addresses.

9. A system as set forth in claim 8 including means for replacing tape location information acquired by counting said pulses during high speed tape transport with tape location information acquired by reading said tape addresses during tape replay, whereby errors in tape location information arrived at as a result of counting said pulses are expunged upon reading a tape address during tape replay.

10. A system as set forth in claim 1 wherein said playback machine includes control switches which are adapted to be actuated by an operator for operation of the machine in a manual mode, and wherein said system includes control switch actuators responsive to said controller means for operating the machine in an automatic mode.

11. A system as set forth in claim 10 wherein said control switch actuators are movable by said controller means to an actuating position for actuating said control switches and to a non-actuating position, and wherein said controller is adapted to sense the positions of said control switch actuators for inhibiting automatic operation of the playback machine when more than one of said control switch actuators is in its actuating position.

12. A system as set forth in claim 11 wherein each of said control switches is a depressible push-button switch, wherein each of said control switch actuators includes a motor for rotating in response to energization by said controller means, a cam rotatable by said motor, cable means coupled between said cam and one of said push-buttons such that, upon energization of said motor, said cam rotates to pull said cable means and said cable means pulls said push-button downwardly to its on position.

13. In a tape playback machine, a system for selecting and replaying desired programs on the tape or selected segments of the tape in any predetermined sequence, comprising:

means for reading a tape having encoded thereon a plurality of programs, tape location indicia, and program location information correlating the position of the programs on the tape with the tape location indicia;

means for generating an operator-readable display of tape location numbers as the tape is transported, said tape location numbers corresponding to said tape location indicia;

operator-actuable selection means for selecting a plurality of said programs for replay and the sequence of replay of the selected programs, and for selecting for replay tape segments whose locations on the tape are identified by operator-entered numbers corresponding to said tape location numbers;

controller means responsive to said selection means for determining from said program location information the location on the tape of said selected programs, responsive to said selection means for locating said selected tape segments by comparing the numbers entered by the operator to the tape location indicia, and for actuating the playback machine to replay the selected programs and the selected tape segments in the sequence selected by the operator, whereby programs on the tape are replayed in any selected sequence and any portions of the tape are replayed in any selected sequence in response to operator identification of tape segments by their location on the tape.

14. A system as set forth in claim 13 wherein said tape location indicia comprises tape addresses spaced from each other along the length of the tape, and wherein said display generating means displays said tape addresses such that, during tape play, an operator is given an indication of the address of the tape then being played.

15. A system as set forth in claim 14 wherein the numbers entered by the operator correspond to the addresses at which each selected tape segment starts and stops.

16. In a tape playback machine, a system for selecting and replaying programs recorded on a tape in any selected sequence comprising:

means for reading a tape having encoded thereon a plurality of programs, a plurality of tape addresses located at spaced intervals along the tape, and a table of contents comprising the starting and stopping tape address of each recorded program;

operator-actuable means for selecting programs for replay and the sequence of their replay;

a microprocessor-based controller responsive to said selection means and said reading means for storing the table of contents in a memory, for actuating the playback machine to transport the tape while comparing tape addresses read from the tape to the starting addresses of the first program selected for replay, for stopping tape transport and for playing the tape when the tape address read from the tape corresponds to the starting address of the first selected program, for stopping play of the tape when the tape address read from the tape corresponds to the stopping address of the first selected program, and for actuating the machine to transport the tape for replay of every other selected program between their starting and stopping address as indicated by the table of contents.

17. A system as set forth in claim 16 wherein said tape addresses and said table of contents are encloded as audio tones on the tape, and wherein said reading means includes means for translating said tones to electrical signals in the form of logical data, and including means for inputting said data to said controller.

* * * * *